United States Patent
Miwa et al.

(10) Patent No.: US 12,105,977 B2
(45) Date of Patent: *Oct. 1, 2024

(54) MULTI-NODE STORAGE SYSTEM AND COOPERATION METHOD FOR PERFORMING INPUT OUTPUT

(71) Applicant: Hitachi, Ltd., Tokyo (JP)

(72) Inventors: Takahiro Miwa, Tokyo (JP); Shusaku Miwa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 17/945,511

(22) Filed: Sep. 15, 2022

(65) Prior Publication Data

US 2023/0229330 A1 Jul. 20, 2023

(30) Foreign Application Priority Data

Jan. 14, 2022 (JP) ................................. 2022-004614

(51) Int. Cl.
*G06F 3/06* (2006.01)

(52) U.S. Cl.
CPC ............ *G06F 3/0643* (2013.01); *G06F 3/061* (2013.01); *G06F 3/067* (2013.01)

(58) Field of Classification Search
CPC .......... G06F 3/067; G06F 3/061; G06F 3/064; G06F 3/0643; G06F 3/0632; G06F 3/0635; G06F 2009/45579; G06F 3/0659; H04L 67/00
See application file for complete search history.

(56) References Cited

U.S. PATENT DOCUMENTS

| | | | |
|---|---|---|---|
| 10,095,506 B2 | 10/2018 | Gopalapura Venkatesh et al. | |
| 10,552,072 B1* | 2/2020 | Bono | G06F 3/0662 |
| 11,165,850 B1* | 11/2021 | Mimata | H04L 67/06 |
| 11,496,547 B2* | 11/2022 | Mimata | H04L 67/108 |
| 2004/0139168 A1* | 7/2004 | Tanaka | G06F 11/2033 709/213 |
| 2008/0104347 A1* | 5/2008 | Iwamura | G06F 3/0619 711/E12.103 |
| 2018/0137013 A1* | 5/2018 | Poojary | G06F 11/1469 |
| 2021/0073089 A1* | 3/2021 | Sathavalli | G06F 9/45558 |

* cited by examiner

*Primary Examiner* — Tasnima Matin
(74) *Attorney, Agent, or Firm* — Volpe Koenig

(57) ABSTRACT

There is provided a storage system that can avoid an increase in inter-node communication in the cooperation between file service and block service. The storage system includes a management section that manages a file processing section of a node in a currently active system and a file processing section of a node in a standby system as a pair, sets the file processing section of the node in the currently active system to be operational, manages a block processing section of the node in the currently active system and a block processing section of the node in the standby system as a pair, and sets the block processing section of the node in the currently active system to be operational.

7 Claims, 19 Drawing Sheets

| FILE CONTROL SECTION ID | Active Node | Standby Node |
|---|---|---|
| FILE CONTROL SECTION 1 | Node1 | Node4 |
| FILE CONTROL SECTION 2 | Node2 | Node4 |
| FILE CONTROL SECTION 3 | Node3 | Node4 |

511, 512, 513

520

| STORAGE OS SECTION ID | Active Node | Standby Node |
|---|---|---|
| STORAGE OS SECTION ID1 | Node1 | Node4 |
| STORAGE OS SECTION ID2 | Node2 | Node4 |
| STORAGE OS SECTION ID3 | Node3 | Node4 |

521, 522, 523

530

| FILE CONTROL SECTION ID | STORAGE OS SECTION ID |
|---|---|
| FILE CONTROL SECTION 1 | STORAGE OS SECTION ID1 |
| FILE CONTROL SECTION 2 | STORAGE OS SECTION ID2 |
| FILE CONTROL SECTION 3 | STORAGE OS SECTION ID3 |

531, 532

540

| NodeID | STATE |
|---|---|
| Node1 | NORMAL |
| Node2 | NORMAL |
| Node3 | NORMAL |
| Node4 | NORMAL |

Table 610:

| BLOCK VOLUME ID (611) | STORAGE OS SECTION ID (612) | WWID (613) | CAPACITY (614) | ACCESS FILE CONTROL SECTION ID (615) |
|---|---|---|---|---|
| BLOCK VOLUME 1 | STORAGE OS SECTION 1 | AAA... | 200GiB | FILE CONTROL SECTION 1 |
| BLOCK VOLUME 2 | STORAGE OS SECTION 1 | BBB... | 2TiB | FILE CONTROL SECTION 1 |
| BLOCK VOLUME 3 | STORAGE OS SECTION 1 | CCC... | 100GiB | FILE CONTROL SECTION 1 |
| BLOCK VOLUME 4 | STORAGE OS SECTION 2 | DDD... | 100GiB | FILE CONTROL SECTION 2 |

Table 620:

| ACCESS FILE CONTROL SECTION ID (621) | STORAGE OS SECTION ID (622) | INITIATOR (623) |
|---|---|---|
| FILE CONTROL SECTION 1 | STORAGE OS SECTION 1 | iqn.1111-11.abc |
| FILE CONTROL SECTION 2 | STORAGE OS SECTION 2 | iqn.2222-22.def |
| FILE CONTROL SECTION 3 | STORAGE OS SECTION 3 | iqn.3333-33.ghi |

Table 630:

| REDUNDANCY GROUP ID (631) | COMPONENT [1] (632) | | COMPONENT [2] (633) | |
|---|---|---|---|---|
| | Device | ACCESS OK/NG | Device | ACCESS OK/NG |
| REDUNDANCY GROUP 1 | Node1, Storage Device1 | OK | Node4, Storage Device7 | OK |
| REDUNDANCY GROUP 2 | Node2, Storage Device3 | OK | Node4, Storage Device7 | OK |
| REDUNDANCY GROUP 3 | Node3, Storage Device5 | OK | Node4, Storage Device7 | OK |

FIG. 7

| FILE SYSTEM ID | OWNERSHIP FILE CONTROL SECTION ID | META DATA (SUCH AS FILE SYSTEM TYPE) |
|---|---|---|
| FILE SYSTEM 1 | FILE CONTROL SECTION1 | XFS |
| FILE SYSTEM 2 | FILE CONTROL SECTION1 | ext4 |
| FILE SYSTEM 3 | FILE CONTROL SECTION2 | XFS |

| RECOGNITION BLOCK VOLUME ID | OWNERSHIP FILE CONTROL SECTION ID | ASSOCIATED FILE SYSTEM ID | Device name | WWID |
|---|---|---|---|---|
| BLOCK VOLUME 1 | FILE CONTROL SECTION1 | FILE SYSTEM 1 | sdm | AAA... |
| BLOCK VOLUME 2 | FILE CONTROL SECTION1 | FILE SYSTEM 1 | sdn | BBB... |
| BLOCK VOLUME 3 | FILE CONTROL SECTION1 | FILE SYSTEM 2 | sdp | CCC... |
| BLOCK VOLUME 4 | FILE CONTROL SECTION2 | FILE SYSTEM 3 | sdy | DDD... |

MULTI-NODE STORAGE SYSTEM AND COOPERATION METHOD FOR PERFORMING INPUT OUTPUT

CROSS-REFERENCE TO RELATED APPLICATION

This application claims priority pursuant to 35 U.S.C. § 119 from Japanese Patent Application No. 2022-004614, filed on Jan. 14, 2022, the entire disclosure of which is hereby incorporated herein by reference.

BACKGROUND

Technical Field

The present invention generally relates to inter-node communication in a storage system.

Related Art

There is a known storage system of related art in which a VM (FSVM: file server virtual machine) for providing file service is placed on each physical server, and the FSVM builds a virtual scale-out file server. Furthermore, there is a known storage system in which a CVM (controller virtual machine) for providing block service is placed as a backend of an FSVM on each physical server to build a virtual scale-out block storage (see U.S. Pat. No. 10,095,506).

SUMMARY OF THE INVENTION

In the storage system described in U.S. Pat. No. 10,095,506, the physical server including the FSVM and the physical server including the CVM, which forms the backend of the FSVM, may differ from each other. In this case, the communication overhead between the physical servers increases, and the performance of access on a file basis (hereinafter referred to as "file access") deteriorates. In this regard, it is conceivable that employing a high-speed network for the network between the physical servers avoids the performance deterioration, but such a high-speed network is generally expensive.

The present invention has been made in consideration of the points described above and proposes a storage system and the like capable of avoiding an increase in inter-node communication in cooperation between file service and block service.

To achieve the object described above, the present invention provides a storage system in which a plurality of nodes that provide file service for performing I/O (input/output) on a file basis and block service for performing I/O on a block basis are coupled with each other via a network. The plurality of nodes each include a storage device that stores data, a file processing section that accepts a file I/O request from a file client and converts the file I/O request into a block I/O request in the file service, and a block processing section that carries out a process for performing I/O from/to the storage device based on the block I/O request in the block service. The plurality of nodes include a node in a currently active system and a node in a standby system. The plurality of nodes each further include a management section that manages the file processing section of the node in the currently active system and the file processing section of the node in the standby system as a pair, sets the file processing section of the node in the currently active system to be operational, manages the block processing section of the node in the currently active system and the block processing section of the node in the standby system as a pair, and sets the block processing section of the node in the currently active system to be operational.

In the configuration described above, for example, the file processing section and the block processing section are paired with each other and placed in the same physical node, so that internal communication is performed between the file processing section and the block processing section, and the number of inter-node communications can be suppressed in the cooperation between file service and the block service. Furthermore, in the configuration described above, for example, the node in the currently active system and the node in the standby system are provided separately from each other, so that hardware resources for the node in the currently active system do not need to be allocated for the node in the standby system, whereby the processing performance of the node in the currently active system can be enhanced.

The present invention can achieve a high-processing-performance storage system. Objects, configurations, and effects other than those described above will be apparent from the following description of an embodiment for implementing the invention.

BRIEF DESCRIPTION OF THE DRAWINGS

FIG. 5 shows an example of management section information according to the first embodiment;

FIG. 6 shows an example of storage control section information according to the first embodiment;

FIG. 7 shows an example of file control section information according to the first embodiment;

Figure 1:
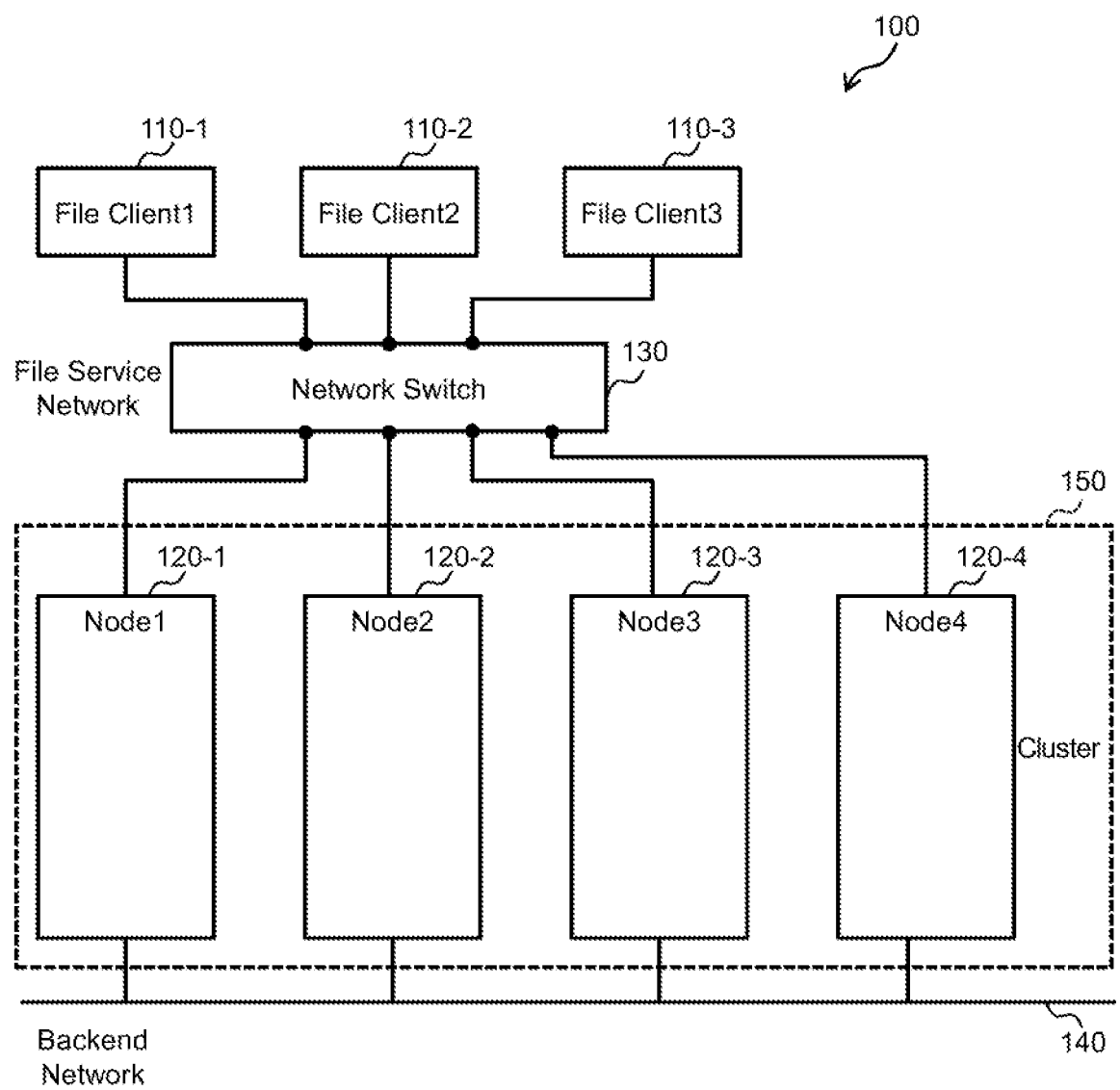
FIG. 1 shows an example of the configuration of a storage system according to a first embodiment.

DETAILED DESCRIPTION OF THE EMBODIMENT (1) First Embodiment

In the present embodiment, a configuration, a method, and the like for achieving the object described above will be described. Furthermore, a configuration, a method, and the like for improving the processing performance of a storage system will also be described below.

In the storage system described in U.S. Pat. No. 10,095,506, for example, during normal operation, data in a file for which an FSVM is responsible resides in a local storage accessed by a CVM that resides on the same physical node, and read access to a file via the physical network can be avoided.

A data protection scheme using a CVM employs an arrangement in which redundant data is distributed to other physical servers as appropriate. Therefore, as the entire data saved in a local storage of a CVM, the redundant data are placed in a large number of physical servers.

In this situation, if a physical node is blocked, the file service and the block service are taken over only by normal physical nodes. However, since the redundant data are distributed to different physical servers, it is necessary for another physical node to perform I/O processing in response to an I/O request from the FSVM after failure, resulting in deterioration of the file access performance.

In this regard, an FSVM in a node in a currently active system and an FSVM in a node in a standby system are paired with a CVM in the node in the currently active system and a CVM in the node in the standby system, respectively, and the pairs are placed in the same physical node, so that the FSVM and CVM perform internal communication in each of the currently active system and the standby system, whereby the number of communications between the physical nodes can be suppressed in the cooperation of the file service and the block service. When one of the pairs of FSVM and CVM in a node in the currently active system and the other pair of FSVM and CVM in a node in the standby system are provided in the same physical node, hardware resources for the standby system need to be reserved for the node in the currently active system, so that the hardware resources cannot be effectively utilized.

An embodiment for solving the problem described above will be described below in detail with reference to the drawings. The following description and drawings are presented by way of example to describe the present invention, and have been partially omitted and entirely simplified as appropriate for clarity of the description. All combinations of the features described in the embodiment are not necessarily essential to the solution provided by the invention. The present invention is not limited to the embodiment, and all applications that agree with the idea of the present invention are encompassed in the technical scope of the present invention. A variety of additions, changes, and other modifications can be made to the present invention by those skilled in the art within the scope of the present invention. The present invention can also be implemented in a variety of other forms. Unless otherwise specified, each component may be handled in the multiple or singular form.

In the following description, a variety of pieces of information may be described by using "table", "list", "queue", and other expressions, and a variety of pieces of information may be expressed in any data structures other than the above. An "XX table", an "XX list", and the like may be called "XX information" to indicate that they are independent of data structures. In a description of the content of each piece of information, expressions such as "identification information", "identifier", "name", "ID", and "number" are used, and these expressions can be substituted for each other.

In the following description, a process achieved by executing a program will be described in some cases, and the program is executed by at least one processors (CPU (central processing unit), for example) to carry out a specified process by using storage resources (memories, for example) and/or interface devices (communication ports, for example) as appropriate, so that the processor may be regarded as the primary part of the process. Similarly, the primary part of the process carried out by executing the program may be a controller, an device, a system, a computer, a node, a storage system, a storage device, a server, a management computer, a client, or a host each of which includes a processor. The primary part of the process carried out by executing the program (processor, for example) may include a hardware circuit that carries out part or entirely of the process. For example, the primary part of the process carried out by executing the program may include a hardware circuit that performs encryption and decryption or compression and expansion. The processor operates as functional portions that achieve predetermined functions by operating in accordance with the program. The device and the system including the processor are an device and a system including the functional portions.

The program may be installed in an device, such as a computer, from a program source. The program source may, for example, be a program distribution server or a computer-readable storage medium. When the program source is a program distribution server, the program distribution server may include a processor (CPU, for example) and storage resources, and the storage resources may further store a distributing program and a program to be distributed. The processor of the program distribution server then executes the distributing program, the processor of the program distribution server may distribute the program to be distributed to other computers. In the following description, two or more programs may be realized as one program, or one program may be realized as two or more programs.

In the following description, identical elements in the drawings have the same number, and no description of the identical elements will be made as appropriate. When elements of the same kind are not distinguished from one another in the description thereof, a common portion (excluding branch number) of reference characters including branch numbers may be used, whereas when the elements of the same kind are distinguished from one another in the description thereof, reference characters including branch numbers may be used. For example, when file clients are not particularly distinguished from one another, "file clients 110" may be used, whereas when the file clients are distinguished from one another, a "file client 110-1", a "file client 110-2", and so on may be used. When elements of the same type are distinguished from one another in the description thereof, reference characters of the elements may be used, or IDs assigned to the elements may be used in place of the reference characters.

FIG. 1 shows an example of the configuration of a storage system 100 according to the present embodiment. The storage system 100 includes one or more file clients 110 and a plurality of nodes 120.

The file clients 110 and the nodes 120 are coupled to each other via a network switch 130. The network switch 130 is an example of a network formed, for example, of a fiber channel (FC), Ethernet (registered trademark), InfiniBand, or a wireless LAN (local area network), and is called a "file service network" below. The nodes 120 are coupled to each other via a network 140. The network 140 is an example of a network formed, for example, of Ethernet (registered trademark), InfiniBand, or a wireless LAN, and is called a "backend network" below.

The file service network and the backend network may, however, be formed of the same network. The file clients 110 and the nodes 120 may each be coupled to a management network other than the file service network and the backend network.

In the storage system 100, a cluster 150 is configured to specify the range containing the nodes 120 subject to failover, as shown in FIG. 1. A plurality of nodes 120 belong to the cluster 150. If failure occurs at one node 120 that belongs to the cluster 150, the process is taken over by another node 120 that belongs to the cluster 150. The other node 120 is a dedicated node 120 that takes over the process, and one or more nodes 120 are specified as the dedicated node 120. The following description will be made with reference to a case where the dedicated node 120 that takes over the process is a node 120-4. Nodes 120-1 to 120-3, which are activated as the currently active system, may be called nodes 120 in the currently active system, and the node 120-4 to be activated as the standby system may be called a node 120 in the standby system. FIG. 1 shows a case where only one cluster 150 is set by way of example. Instead, a plurality of clusters 150 may be set in the storage system 100.

The file clients 110 are each a general-purpose computer that functions as a host (higher-level device) with respect to the nodes 120. The file clients 110 may each be a virtual computer, such as a virtual machine, and may be provided at a node 120.

The file clients 110 each transmit a read request on a file basis or a write request on a file basis (hereinafter referred to as "file I/O request") to a node 120 in response, for example, to a user's operation or a request from an implemented application program. The file I/O request may be a request that specifies a file to be accessed in accordance with a protocol such as CIFS (common Internet file system) or NFS (network file system).

The nodes 120 are each a general-purpose computer that provides storage area for reading and writing data to a file client 110.

Figure 2:
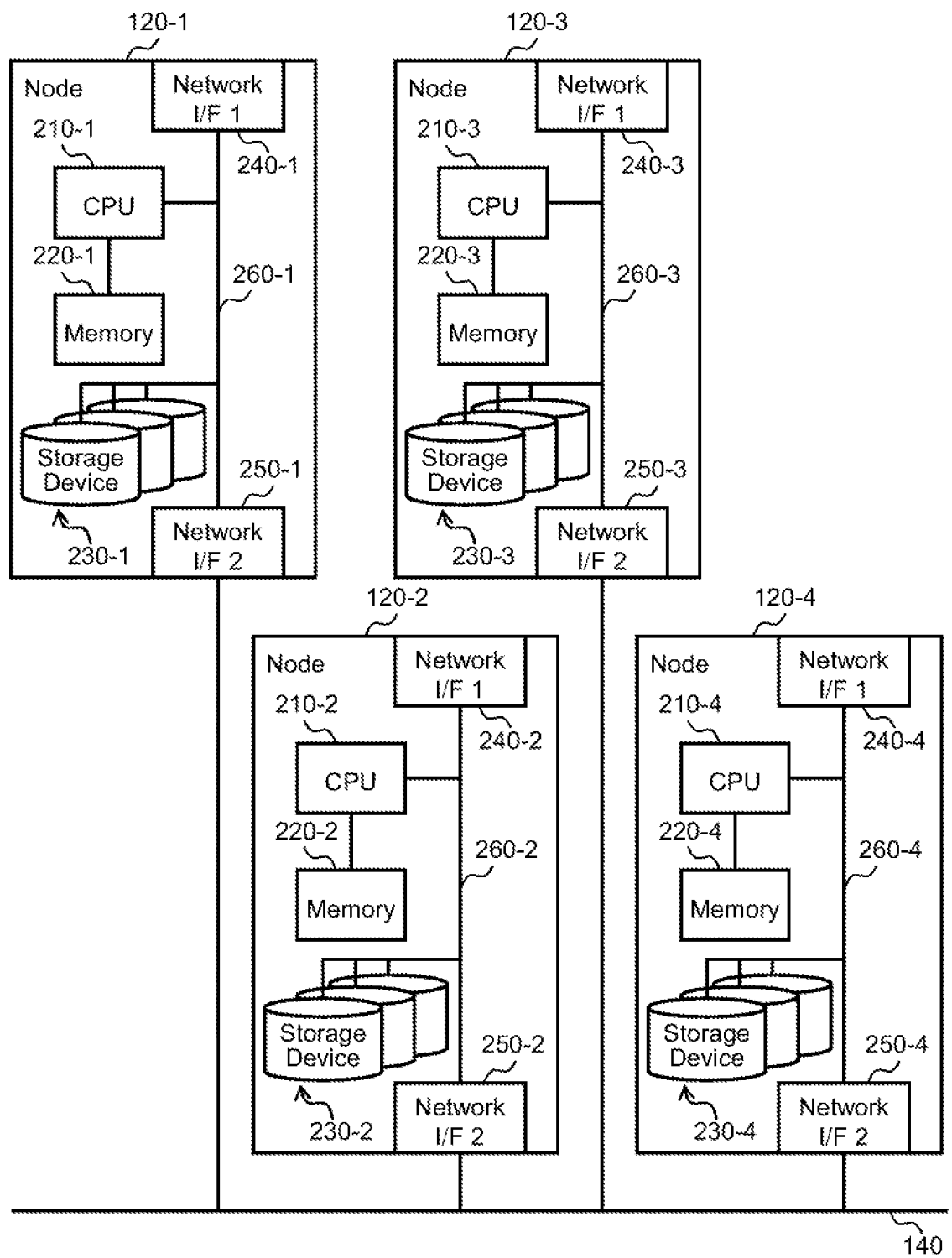
FIG. 2 shows an example of the hardware configuration of a node according to the first embodiment.

FIG. 2 shows an example of the hardware configuration of each of the nodes 120.

The nodes 120 each include as components thereof a CPU 210, a memory 220, a plurality of storage devices 230, a first communication device 240, and a second communication device 250. The components are coupled to each other via an internal network 260. The nodes 120 each include one or more of the components.

The CPU 210 is a processor responsible for controlling the operation of the entire node 120. The memory 220 is formed of a volatile semiconductor memory such as an SRAM (static RAM (random access memory)) and a DRAM (dynamic RAM), and used as a work memory where the CPU 210 temporarily holds a variety of programs and necessary data. The program stored in the memory 220 is executed by at least one or more CPUs 210 to carry out a variety of processes carried out by the node 120 as a whole, as will be described later.

The storage devices 230 are each formed of a large-capacity nonvolatile storage device, such as an NVMe (nonvolatile memory) drive, an SAS (serial attached SCSI (small computer system interface)) drive, an SATA (serial ATA (advanced technology attachment)), an SSD (solid state drive), or an SCM (storage class memory), and provides a storage area for reading/writing data from/to a file client 110.

The first communication device 240 is an interface that allows the node 120 to communicate with a file client 110 via the file service network. The first communication device 240 is formed, for example, of a NIC (network interface card), an FC card, or a wireless LAN card. The first communication device 240 performs protocol control during communication with a file client 110. The communication protocol via the file service network includes CIFS and NFS.

The second communication device 250 is an interface that allows the node 120 to communicate with the other nodes 120 via the backend network. The second communication device 250 is formed, for example, of an NIC or a wireless LAN card. The second communication device 250 performs protocol control during communication with the other nodes 120.

The hardware configuration of each of the nodes 120 in the storage system 100 satisfies hardware resources that can realize the functions of the node 120 (such as file control section 310 and storage control section 320, which will be described later). In this case, the hardware configurations of the nodes 120 may be the same or differ from one another. The hardware resources include the processing speed of the CPU 210 and the capacity of the memory 220.

The storage system 100 may be provided with a node 120 used by a manager (hereinafter referred to as "management node") of the storage system 100 (hereinafter referred to as "system manager"), for example, to manage the configuration of the storage system 100 and set a variety of parameters. The management node issues necessary instructions to the file clients 110 and the nodes 120 in accordance with the operation of the system manager.

Figure 3:
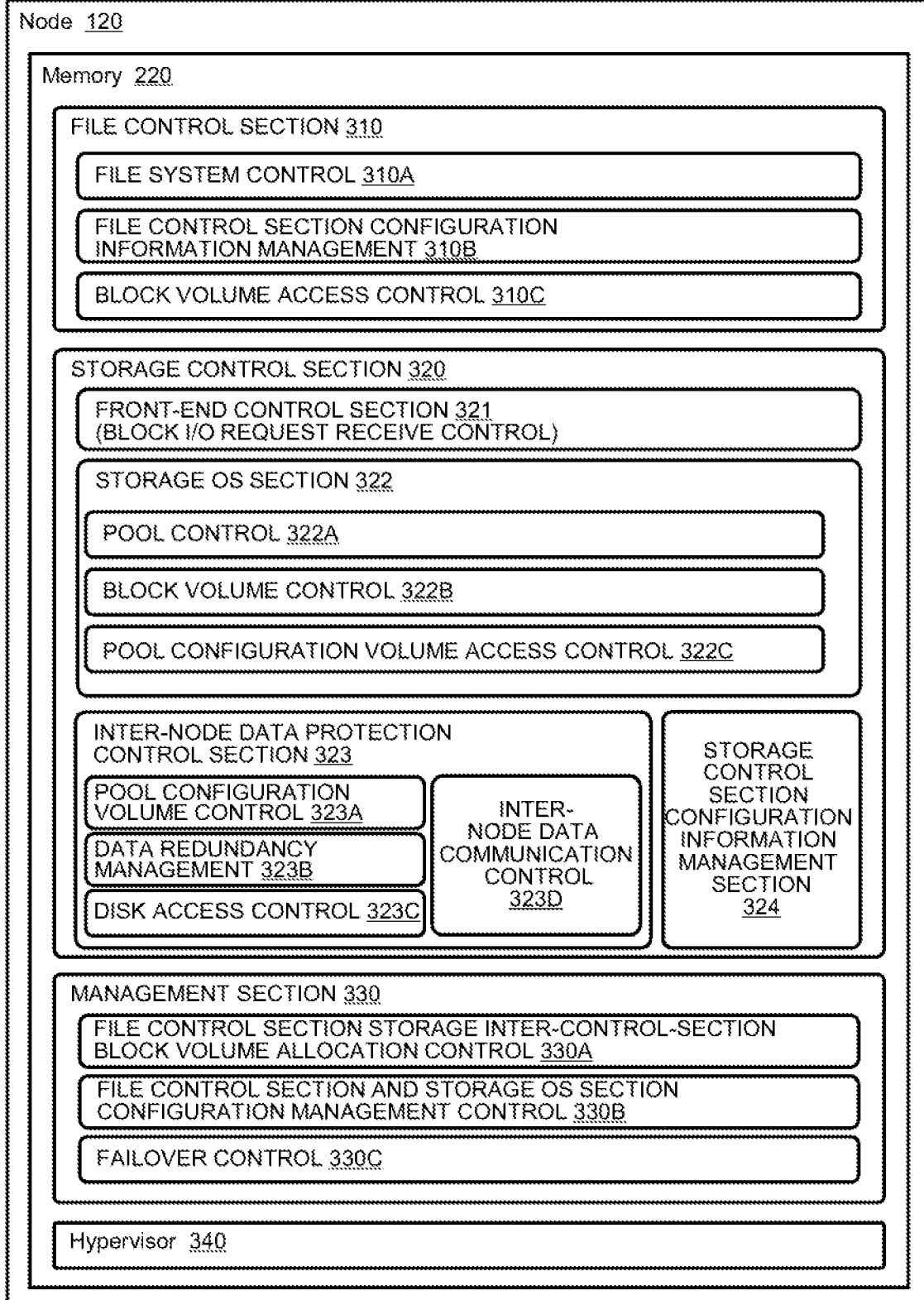
FIG. 3 shows an example of the software configuration of each of the nodes according to the first embodiment.

FIG. 3 shows an example of the software configuration of each of the nodes 120.

The nodes 120 each include a file control section 310, a storage control section 320, a management section 330, and a hypervisor 340.

The file control section 310 is, for example, a VM that provides file service. The file control section 310 is software that configures, along with the file control sections 310 of the other nodes 120, a cluster (builds virtual scale-out file server) and carries out processes relating to file service. The nodes 120 that belong to the cluster that provides file service entirely or partially coincide with the nodes 120 that belong to the cluster 150.

More specifically, the file control section 310 performs file system control 310A, file control section configuration information management 310B, block volume access control 310C, and other types of control.

In the file system control 310A, the file control section 310 controls file system exchange, for example, what kind of file system is provided to a file client 110. For example, the file control section 310 receives, via the first communication device 240, the file I/O request from a file client 110. Furthermore, for example, the file control section 310 transmits, via the first communication device 240, a response corresponding to the file I/O request (hereinafter referred to as "file I/O response") to the file client 110.

In the file control section configuration information management 310B, the file control section 310 manages configuration information (for example, file control section information 430, which will be described later) representing, for example, what kind of file system the file control section 310 owns, and what kind of block volume (logical volume) that the file control section 310 recognizes. For example, the file control section 310 sets parameters specified by the management section 330 and other pieces of information.

In the block volume access control 310C, the file control section 310 accesses a block volume based on the file I/O request. For example, the file control section 310 converts the file I/O request into a read request on a block basis to the block volume or a write request on a block basis to the block volume (hereinafter referred to as "block I/O request"). The file control section 310 notifies the storage control section 320 in the node 120 to which the file control section 310 belongs of the block I/O request. For example, the file control section 310 receives a response corresponding to the block I/O request (hereinafter referred to as "block I/O response") from the storage control section 320.

In the storage system 100, the file control section 310 implemented in each of the nodes 120 of the currently active system (nodes 120-1 to 120-3 in the present embodiment) is caused by the management section 330 to be paired with another file control section 310 placed in the dedicated node 120 in the standby system (node 120-4 in present embodiment), and the pair provides redundancy. The pair is called a "file control section pair" in the following description.

In the file control section pair, the file control section 310 in a node 120 in the currently active system is set to be capable of accepting and processing the file I/O request from a file client 110 (state of currently active system and hereinafter referred to as "active type"). When the nodes 120 in the currently active system (nodes 120 including active-type file control sections 310) normally operate, the file control section 310 of the node 120 in the standby system does not accept the file I/O request from a file client 110, whereas when a node 120 in the currently active system does not normally operate, the file control section 310 of the node 120 in the standby system can accept the file I/O request from a file client 110 (state of standby system and hereinafter referred to as "standby type").

In the storage system 100, data accessed by an active-type file control section 310 and data on an CS disk of the active-type file control section 310 (data necessary as OS, such as OS data and log data, and hereinafter referred to "OS disk data") are made redundant in the node 120 including the standby-type file control section 310. In the storage system 100, when failure occurs, for example, at an active-type file control section 310 or a node 120 where an active-type file control section 310 is placed, the state of the standby-type file control section 310 is switched to the state in which the standby-type file control section 310 can accept and process the file I/O request. Therefore, when an active-type file control section 310 cannot operate, the process relating to the file service provided by the active-type file control section 310 can be taken over by the standby-type file control section 310, which forms the same file control section pair.

The storage control section 320 is a VM that provides block service. The storage control section 320 is software that configures, along with the storage control sections 320 in the other nodes 120, a cluster (builds virtual scale-out block storage) and carries out processes relating to block service. The storage control section 320 may be software that functions as a software defined storage (SDS) controller. The storage control section 320 may have a storage function of storing a block volume. Typical examples of the storage function include a local copy function of creating and managing a duplicate in the storage system 100, a compression and deduplication function of reducing the amount of data to be stored, and a tier control function of dynamically moving data between the storage devices 230 having different I/O performance and characteristics, such as SSDs and HDDs.

More specifically, the storage control section 320 includes a frontend control section 321, a storage OS section 322, an inter-node data protection control section 323, a storage control section configuration information management section 324.

When receiving the block I/O request from the file control section 310, the frontend control section 321 notifies the storage OS section 322 in the node 120 to which the frontend control section 321 belongs and which should execute the block I/O request of the block I/O request.

The storage OS section 322 generates an I/O command corresponding to the block I/O request and reads/writes data from/to any of the storage devices 230. More specifically, the storage OS section 322 notifies the inter-node data protection control section 323 of the I/O command.

In the storage system 100, the storage OS section 322 implemented in each of the nodes 120 in the currently active system is caused by the management section 330 to be paired with another storage OS section 322 placed in the node 120 in the standby system, and the pair provides redundancy. The pair is called a "storage OS pair" in the following description.

In the storage OS pair, the storage OS section 322 in the node 120 in the currently active system is set to be capable of accepting and processing the block I/O request from the file control section 310 (state of currently active system and hereinafter referred to as "active type"). When the nodes 120 in the currently active system (nodes 120 including active type storage OS section 322) normally operate, the storage OS section 322 of the node 120 in the standby system does not accept the block I/O request from the file control section 310 of the node 120 in the standby system, whereas when a node 120 in the currently active system does not normally operate, the storage OS section 322 of the node 120 in the standby system can accept and process the block I/O request from the file control section 310 of the node 120 in the standby system (state of standby system and hereinafter referred to as "standby type").

In the storage system 100, when failure occurs, for example, at an active-type storage OS section 322 or a node 120 where an active-type storage OS section 322 is placed, the state of the standby-type storage OS section 322 is switched to the state in which the standby-type storage OS section 322 can accept and process the block I/O request. Therefore, when an active-type storage OS section 322 cannot operate, the process relating to the block service performed by the active-type storage OS section 322 can be taken over by the standby-type storage CS section 322, which forms the same storage OS section pair.

The storage OS section 322 performs pool control 322A, block volume control 322B, and pool configuration volume access control 322C.

In the pool control 322A, the storage OS section 322 combines a plurality of pool configuration volumes with one another to create a pool. (logical volume) and manages the pool. The pool configuration volume is a logical volume (logical chunk) corresponding to a physical chunk (storage area having predetermined size) in a storage device 230 of the node 120 to which the storage OS section 322 belongs.

In the block volume control 322B, the storage OS section 322 cuts a plurality of pages off the pool, generates a block volume to which one or more of the pages are allocated, and manages the block volume. The block volume is a virtual logical volume according to thin provisioning.

In the pool configuration volume access control 322C, the storage OS section 322 accesses the pool configuration volume based on the block I/O request. To access the pool configuration volume, the storage OS section 322 generates an I/O command on a pool configuration volume basis from the block I/O request (converts address of block volume into address of pool configuration volume), and notifies the inter-node data protection control section 323 of the I/O commands. In the I/O command, for example, the pool configuration volume at the I/O destination and the address in the pool configuration volume are specified.

The inter-node data protection control section 323 reads and writes data from/to any of the storage devices 230 based on the I/O command. More specifically, the inter-node data protection control section 323 performs pool configuration volume control 323A, data redundancy management 323B, disk access control 323C, and inter-node communication control. 323D.

In the pool configuration volume control 323A, the inter-node data protection control section 323 creates a pool configuration volume and manages the pool configuration volume. The inter-node data protection control section 323 allocates a physical storage area provided by any of the storage devices 230 of the node 120 to which the inter-node data protection control section 323 belongs to the storage OS section 322 located in the node 120 to which the inter-node data protection control section 323 belongs.

In the data redundancy management 323B, the inter-node data protection control section 323 makes data redundant between the nodes 120. For example, when the file I/O request is a write request on a file basis, the inter-node data protection control section 323 makes data redundant at the node 120 in the standby system. For example, when the file I/O request is a read request on a file basis, the inter-node data protection control section 323 reads data from the node 120 in the standby system if the storage devices 230 of the node 120 to which the inter-node data protection control section 323 belongs are not accessible.

In the disk access control 323C, the inter-node data protection control section 323 evaluates in which physical chunk the I/O target data resides and reads/writes the data from/to the storage device 230. For example, when receiving an I/O command from the storage OS section 322, the inter-node data protection control section 323 refers to a management table that is not shown to identify the storage device 230 that provides one physical chunk out of the physical chunks that is associated with the pool configuration volume specified in the I/O command. The inter-node data protection control section 323 then performs I/O operation on the pool configuration volume specified by the I/O command and the data at the address of the physical chunk corresponding to the address in the pool configuration volume, the volume and the data both stored in the identified storage device 230.

In the inter-node communication control 323D, the inter-node data protection control section 323 controls communication between the nodes 120. For example, when the I/O command received from the storage OS section 322 is a write command that instructs writing to any of the storage devices 230, the inter-node data protection control section 323 transmits a write command to the inter-node data protection control section 323 of the node 120 in the standby system. The storage control section 320 including the inter-node data protection control section 323 having received the write command writes data based on the write command to a storage device 230 of the node 120 to which the storage control section 320 belongs.

The storage control section configuration information management section 324 manages configuration information (for example, storage control section information 420, which will be described later), for example, the placement of redundant data, whether or not the storage devices 230 are accessible, what kind of physical chunk the storage devices 230 each have, to which pool configuration volume each physical chunk is allocated, what kind of pool configuration volume the pool has, and to which block volume a page cut off the pool is allocated. The configuration information, such as the pool, the block volumes, and other pieces of information, is managed on a storage OS pair basis. That is, the pool, the block volumes, and other pieces of information are created in the nodes 120 of the currently active system, and the created configuration information is registered in an inter-cluster DB 400, so that the configuration information can be reflected in the node 120 of the standby system at the time of failover.

The management section 330 is software having the functions of performing control on the entire cluster 150, control on the scale-out operation of the cluster 150, and other types of control. In the storage system 100, one of the management sections 330 implemented in the nodes 120 in the cluster 150 is set as a master, and only the management section 330 set as the master performs the variety of types of control while maintaining the integrity of the entire cluster 150.

The management sections other than the master management section 330 are set to operate in one of operation modes, a hot standby mode and a warm standby mode, in case of failure of the master management section 330.

The hot standby mode is an operation mode in which the standby state activated so that the processes performed by the master management section 330 can be immediately taken over is maintained in the event of failure of the master management section 330, the node 120 where the master management section 330 is implemented, or any other component.

A management section 330 operating in the hot standby mode holds management information having the same contents as those of all pieces of management information managed by the master management section 330 (for example, inter-cluster DB 400, which will be described later), such as a file control section pair table 510 and a storage OS section pair table 520, which will be described later, so that the management section 330 operating in the hot standby mode can immediately take over the processes performed by the master management section 330.

Thereafter, when the management information held by the master management section 330 is updated, the difference before and after the update is provided as difference data from the master management section 330 to all the management sections 330 operating in the hot standby mode via the backend network, and based on the difference data, the management information held by the management sections 330 is updated by the management sections 330 in the same manner in which the management information held by the master management section 330 is updated.

The configuration in which the management sections 330 operating in the hot standby mode keep holding the same management information as that of the master management section 330 allows, even when failure occurs in the master management section 330 and any of the management sections 330 previously operating in the hot standby mode is switched to the "master", the master management section 330 switched to the "master" to take over the control performed by the original master management section 330.

The warm standby mode is an operation mode which is in the standby state in which the activation is terminated. When the number of management sections 330 set to operate in the hot standby mode falls below a threshold set in advance, the state of any of the management sections 330 set to operate in the warm standby mode is switched to operate in the hot standby mode.

To prevent a situation in which two or more master management sections 330 are present, three or more management sections 330 are activated, and the master management section 330 is selected by majority vote out of the activated management sections 330. The remaining activated management sections 330 are then set to operate in the hot standby mode.

More specifically, the management sections 330 each perform block volume allocation control 330A between a file control section and a storage control section, file control section configuration and storage OS section configuration management control. 330B, and failover control 330C.

In the block volume allocation control 330A between a file control section and a storage control section, the management section 330 controls, for example, which block volume is allocated to which file control section 310.

In the file control section configuration and storage OS section configuration management control 330B, the management section 330 performs control on the file control section pair and the storage CS section pair.

For example, the management section 330 sets the file control section pair in the cluster 150 in response to an instruction from the management node, and registers and manages the set file control section pair in the file control section pair table 510, which will be described later. For example, the management section 330 sets the storage OS section pair in the cluster 150 in response to an instruction from the management node, and registers and manages the set storage OS section pair in the storage OS section pair table 520, which will be described later.

For example, the management section 330 determines a combination of the file control section pair and the storage OS section pair (hereinafter referred to as "redundancy group") in such a way that an active-type file control section 310 and an active-type storage OS section 322 are placed in the same node 120 of the currently active system and a standby-type file control section 310 and a standby-type storage OS section 322 are placed in the same node 120 of the standby system.

In the failover control 330C, when failure occurs in a node 120, the management section 330 causes the file control section 310 and the storage control section 320 to undergo failover. For example, the management section 330 instructs the standby-type storage OS section 322 to take over the active-type storage OS section 322, and then instructs the standby-type file control section 310 to take over the active-type file control section 310.

The management section 330 may be provided in the management node, accommodated in the file control section 310, or accommodated in the storage control section 320.

The hypervisor 340 is software that operates the file control section 310, the storage control section 320, the management section 330, and other components.

Figure 4:
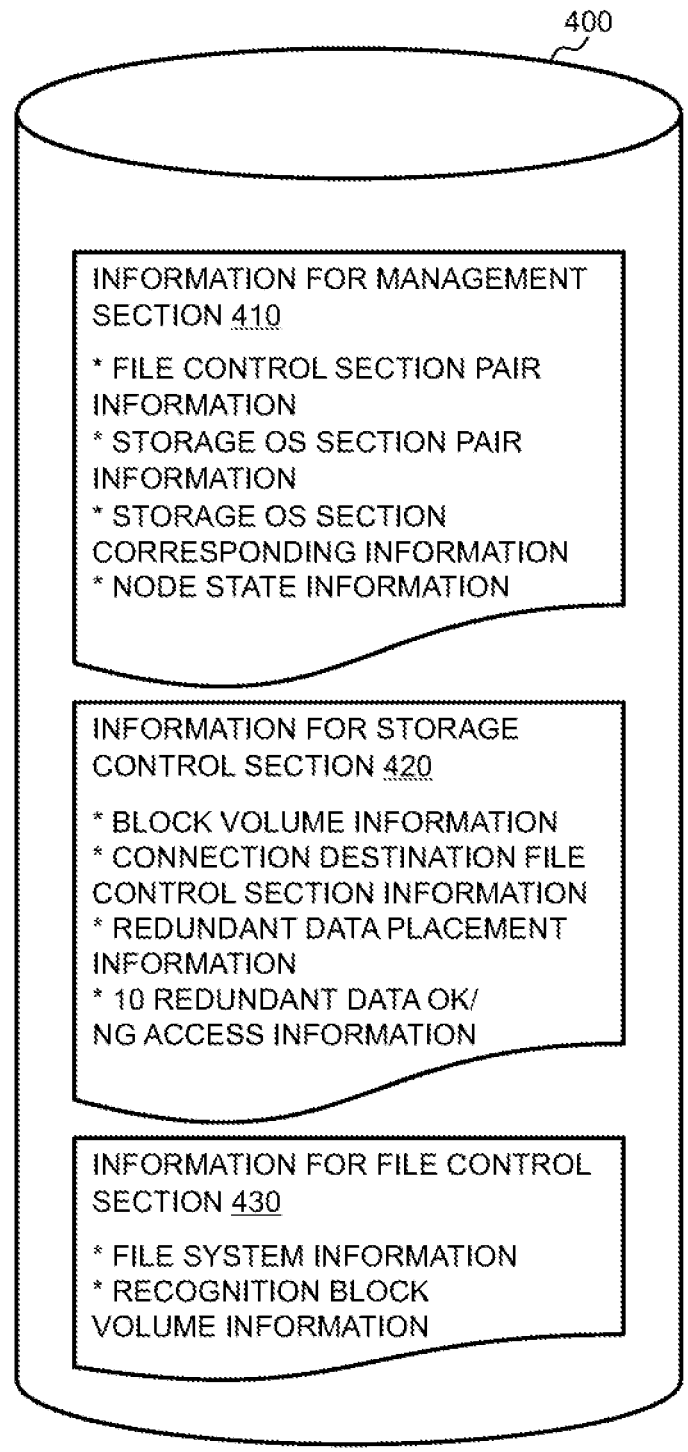
FIG. 4 shows an example of an inter-cluster DB according to the first embodiment.

FIG. 4 shows an example of the inter-cluster DB 400. The inter-cluster DB 400 stores information necessary for each cluster 150. The inter-cluster DB 400 may be duplicated and provided in all the nodes 120 or in one or more management nodes.

The inter-cluster DB 400 stores management section information 410, the storage control section information 420, and the file control section information 430.

The management section information 410 contains file control section pair information, storage OS section pair information, file control section-storage OS section correspondence information, and node state information. The management section information 410 will be described later with reference to FIG. 5.

The storage control section information 420 contains block volume information, connection destination file control section information, redundant data placement information, and redundant data accessibility information. The storage control section information 420 will be described later with reference to FIG. 6.

The file control section information 430 contains file system information and recognition block volume information. The file control section information 430 will be described later with reference to FIG. 7.

FIG. 5 shows an example of the management section information 410.

The management section information 410 contains the file control section pair table 510, the storage OS section pair table 520, a file control section-storage OS section correspondence table 530, and a node state table 540.

The file control section pair table 510 is an example of the file control section pair information and stores information representing in which node 120 the file control section pair is configured. In other words, the file control section pair table 510 stores placement information representing in which node 120 an active-type file control section 310 is placed and in which node 120 a standby-type file control section 310 is placed. More specifically, the file control section pair table 510 stores information that associates a file control section ID 511, an active node 512, and a standby node 513 with one another.

The file control section ID 511 is information for identifying a file control section pair. The active node 512 is information representing which node 120 is provided with the active-type file control section 310 of the file control section pair. The standby node 513 is information representing which node 120 is provided with the standby-type file control section 310 of the file control section pair.

The storage OS section pair table 520 is an example of the storage OS section pair information and stores information representing in which node 120 the storage OS section pair is configured. In other words, the storage OS section pair table 520 stores placement information representing in which node 120 an active-type storage OS section 322 is placed and in which node 120 a standby-type storage OS section 322 is placed. More specifically, the storage OS section pair table 520 stores information that associates a storage OS section ID 521, an active node 522, and a standby node 523 with one another.

The storage OS section ID 521 is information for identifying a storage OS section pair. The active node 522 is information representing which node 120 is provided with the active-type storage OS section 322 of the storage OS section pair. The standby node 523 is information representing which node 120 is provided with the standby-type storage OS section 322 of the storage OS section pair.

The file control section-storage OS section correspondence table 530 is an example of the file control section-storage OS section correspondence information and stores information representing the correspondence between the file control section 310 and the storage OS section 322. More specifically, the file control section-storage OS section correspondence table 530 stores information that associates a file control section ID 531 and a storage OS section ID 532 with each other.

The file control section ID 531 is information for identifying a file control section 310. The storage OS section ID 532 is information for identifying the storage OS section 322 paired with the file control section 310.

The node state table 540 is an example of the node state information and stores information representing the state of a node 120. More specifically, the node state table 540 stores information that associates a node ID 541 with a state 542.

The node ID 541 is information for identifying a node 120. The state 542 is information representing the state ("normal" or "blocked") of the node 120.

FIG. 6 shows an example of the storage control section information 420.

The storage control section information 420 contains a block volume table 610, a connection destination file control section table 620, and a redundant data accessibility table 630.

The block volume table 610 is an example of the block volume information and stores information on the block volume provided by a storage control section 320. More specifically, the block volume table 610 stores information that associates a block volume ID 611, a storage OS section ID 612, a WWID (world wide ID) 613, a capacity 614, and an access file control section ID 615 with one another.

The block volume ID 611 is information for identifying a block volume. The storage OS section ID 612 is information for identifying the storage OS section 322 having the block volume. The WWID 613 is information necessary for access to the block volume based on the file I/O request, and is also information for uniquely identifying the block volume. The capacity 614 is information representing the capacity of the block volume. The access file control section ID 615 is information for identifying the file control section 310 that accesses the block volume.

The connection destination file control section table 620 is an example of the connection destination file control section information and stores information on the file control section 310 as a client to which a storage control section 320 is coupled. The connection destination file control section table 620 stores information that associates a file control section ID 621, a storage OS section ID 622, and an initiator 623 with one another.

The file control section ID 621 is information for identifying a file control section 310. The storage OS section ID 622 is information for identifying the storage OS section 322 that provides the file control section 310 with block service. The initiator 623 is information for identifying a module to which the block I/O path is connected, that is, a module from which the I/O request is issued (which is, for example, first communication device 240, and may be hardware module or program module). For example, the initiator 623 is used when communication between a file control section 310 and a storage control section 320 is performed by using iSCSI (Internet small computer system interface).

The redundant data accessibility table 630 is an example of the redundant data accessibility information and stores information representing whether or not redundant data is accessible (I/O). More specifically, the redundant data accessibility table 630 stores information that associates a redundancy group ID 631, a first component 632, and a second component 633.

The redundancy group ID 631 is information for identifying a redundancy group. The first component 632 is information representing a first component of the redundancy group. The first component 632 contains, for example, information for identifying the storage device 230 that is the first component of the redundancy group, and information representing whether or not the storage device 230 is accessible. The second component 633 is information representing a second component of the redundancy group. The second component 633 contains, for example, information for identifying the storage device 230 that is the second component of the redundancy group, and information representing whether or not the storage device 230 is accessible.

FIG. 7 shows an example of the file control section information 430.

The file control section information 430 contains a file system table 710 and a recognition block volume table 720.

The file system table 710 is an example of the file system information and stores information on the file service (file system) provided by a file control section 310. More specifically, the file system table 710 stores information that associates a file system ID 711, an ownership file control section ID 712, and a metadata 713 with one another.

The file system ID 711 is information for identifying a file system. The ownership file control section ID 712 is information for identifying the file control section 310 that owns the file system. The metadata 713 is information such as the file system type of the file system.

The recognition block volume table 720 is an example of the recognition block volume information and stores information representing what kind of block volume the file control section 310 recognizes. More specifically, the recognition block volume table 720 stores information that associates a recognition block volume ID 721, an ownership file control section ID 722, an associated file system ID 723, a device name 724, and a WWID 725 with one another.

The recognition block volume ID 721 is information for identifying the block volume recognized by a file control section 310. The ownership file control section ID 722 is information for identifying the file control section 310 that owns the block volume. The associated file system ID 723 is information for identifying the file system associated with the block volume. The device name 724 is a device name assigned by the OS of a file control section 310 and used for the block volume. The WWID 725 is information for uniquely identifying the block volume. The device name and the WWID are tied with each other by the recognition block volume table 720.

Figure 8:
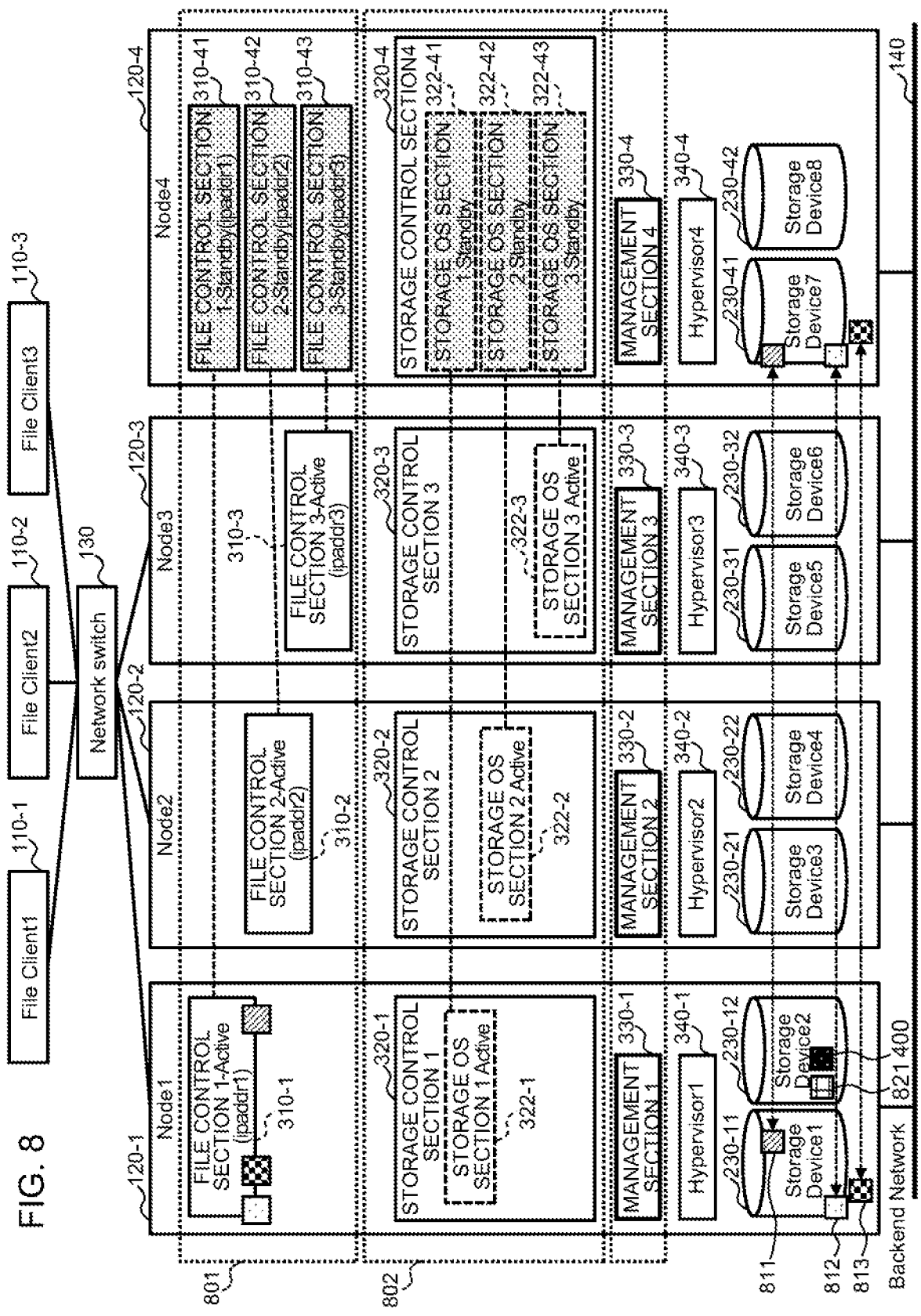
FIG. 8 shows an example of the arrangement of file control section pairs and storage OS section pairs according to the first embodiment.

FIG. 8 shows an example of the arrangement of the file control section pairs and the storage CS section pairs.

In the file service cluster 801, active-type file control sections 310 and standby-type file control sections 310 are paired with each other and provided in different nodes 120.

In the example shown in FIG. 8, a first file control section 310 is so configured that an active-type first file control section 310-1. (hereinafter referred to as "active file control section") and a standby-type first file control section 310-41 (hereinafter referred to as "standby file control section") are paired with each other, with the active file control section provided in the first node 120-1, the standby file control section provided in the fourth node 120-4.

A second file control section 310 is so configured that an active-type second file control section 310-2 and a standby-type second file control section 310-42 are paired with each other, with the active-type second file control section 310-2 provided in the second node 120-2, the standby-type second file control section 310-42 provided in the fourth node 120-4.

A third file control section 310 is so configured that an active-type third file control section 310-3 and a standby-type third file control section 310-43 are paired with each other, with the active-type third file control section 310-3 provided in the third node 120-3, the standby-type third file control section 310-43 provided in the fourth node 120-4.

In the block service cluster 802, active-type storage OS sections 322 and standby-type storage OS sections 322 are paired with each other, and are provided at different nodes 120 in correspondence with the file control section pairs.

In the example shown in FIG. 8, a first storage OS section 322 is so configured that an active-type first storage OS section 322-1 (hereinafter referred to as "active storage OS section") and a standby-type first storage OS section 322-41 (hereinafter referred to as "standby storage OS section") are paired with each other in correspondence with the pair of the active file control section and the standby file control section, with the active storage OS section provided in the first node 120-1, the standby storage OS section provided in the fourth node 120-4.

A second storage OS section 322 is so configured that an active-type second storage OS section 322-2 and a standby-type second storage OS section 322-42 are paired with each other in correspondence with the pair of the active-type second file control section 310-2 and the standby-type second file control section 310-42, with the active-type second storage OS section 322-2 provided in the second node 120-2, the standby-type second storage OS section 322-42 provided in the fourth node 120-4.

A third storage OS section 322 is so configured that an active-type third storage OS section 322-3 and a standby-type third storage OS section 322-43 are paired with each other in correspondence with the pair of the active-type third file control section 310-3 and the standby-type third file control section 310-43, with the active-type third storage OS section 322-3 provided in the third node 120-3, the standby-type third storage OS section 322-43 provided in the fourth node 120-4.

As described above, in the storage system 100, the file control sections 310 and the storage OS sections 322 are configured in pairs, and the nodes 120 are disposed accordingly. In the file control section pairs and the storage OS section pairs, the active-type sections in the corresponding pairs are disposed at the same node 120, and the standby-type sections in the corresponding pairs are disposed at the same node 120, so that a straight configuration can be maintained not only in normal operation but also in failover.

The storage system 100 is provided with the storage devices 230 allocated exclusively to the storage control sections 320 (storage devices 230 that leave disk control to storage control sections 320, for example, storage devices 230-11, 230-21, 230-31, and 230-41), and the storage devices 230 access to which is controlled by the hypervisor 340 (system disk, data storage, and other components, for example, storage devices 230-12, 230-22, 230-32, and 230-42).

In the storage system 100, OS disk data 811 for a file control section 310 is provided by the storage control section 320 from the storage device 230 allocated to the storage control section 320, and OS disk data 821 for the storage control section 320 is provided by the hypervisor 340.

For example, the OS disk data 811 for the active file control section and data 812 and 813 on a file basis provided by the active file control section reside in the first storage device 230-11 in the same first node 120-1 and are made redundant in the fourth node 120-4, where the standby file control section is located. Although not shown, the same holds true for the OS disk data 811 and the data 812 and 813 on a file basis in the other nodes 120. As an additional remark, a standby-type file control section 310 can operate as a VM equivalent to an active-type file control section 310.

For example, the OS disk data 821 and the inter-cluster DB 400 for the first storage control section 320-1 are stored in the second storage device 230-12 dedicated to each node 120, separately from the first storage device 230-11, which provides the first file control section 310-1 with the OS disk data 821 and the inter-cluster DB 400. Although not shown, the same holds true for the OS disk data 821 and the inter-cluster DB 400 for the storage control sections 320 in the other nodes. As an additional remark, a standby-type storage OS section 322 can operate as a processing section of a storage control section 320 similar to an active-type storage CS section 322 by using information from the inter-cluster DB 400.

Figure 9:
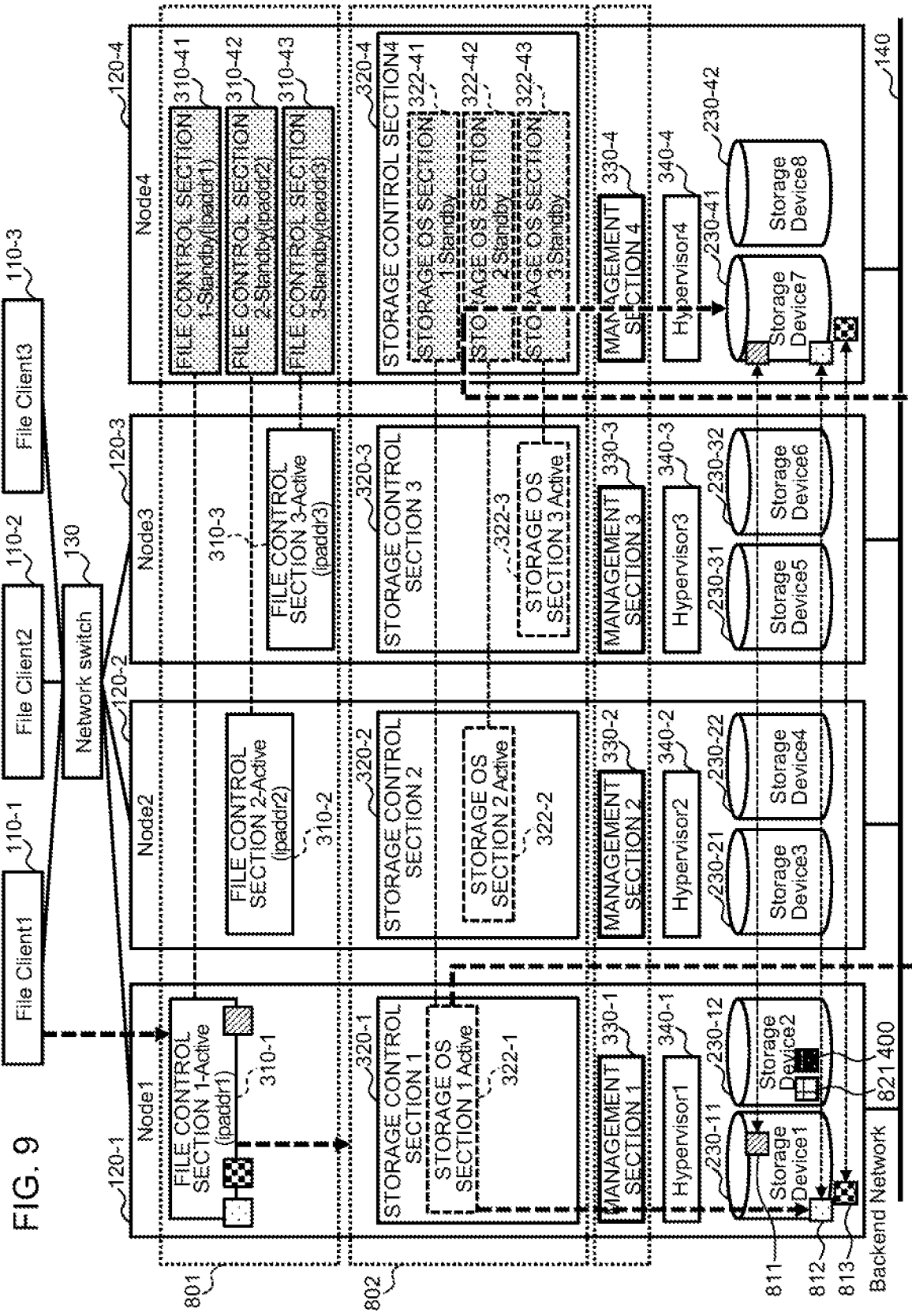
FIG. 9 shows an example of I/O processing under normal conditions according to the first embodiment.

FIG. 9 shows an example of the I/O processing under normal conditions. FIG. 9 describes the I/O processing with reference to a case where a file access request (file I/O request) is issued from a file client 110 to an active file control section.

The active file control section notifies the first storage control section 320-1, which includes an active storage OS section having a matching pair configuration, of the block I/O request through memory access (internal access).

The active storage OS section performs block access (internal access) to the first storage device 230-11 of the node 120-1 to which the active storage OS section belongs via the inter-node data protection control section 323. When the block I/O request is a read request on a block basis, the inter-node data protection control section 323 reads data from the first storage device 230-11 of the node 120-1 to which the inter-node data protection control section 323 belongs. When the block I/O request is a write request on a block basis, the inter-node data protection control section 323 writes data to the first storage device 230-11 of the node 120-1 to which the inter-node data protection control section 323 belongs, and instructs a fourth storage control section 320-4 including a standby storage OS section to write the data via the backend network.

Figure 10:
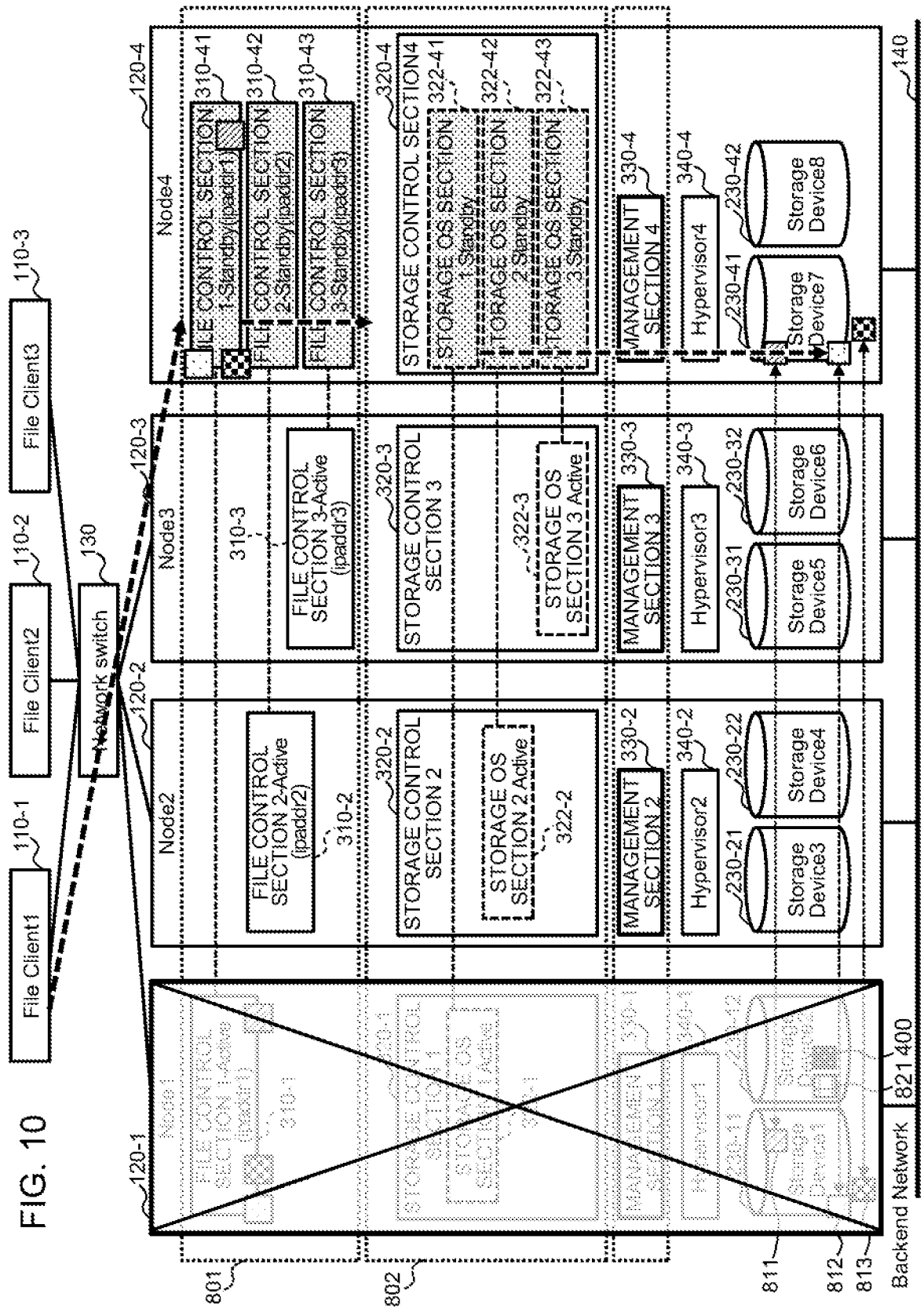
FIG. 10 shows an example of I/O processing in the event of failure according to the first embodiment.

FIG. 10 shows an example of the I/O processing in the event of failure (after failover). FIG. 10 describes the I/O processing with reference to a case where a file access request (file I/O request) is issued from a file client 110 to a standby file control section. Note that when the standby file control section enables the IP address to start operating, the file access destination transitions from the active file control section to the standby file control section.

When the standby file control section takes over processes relating to the file service, and the standby storage OS section takes over processes relating to storage service, a seventh storage device 230-41 under the control of the standby sections is accessed (I/O).

Figure 11:
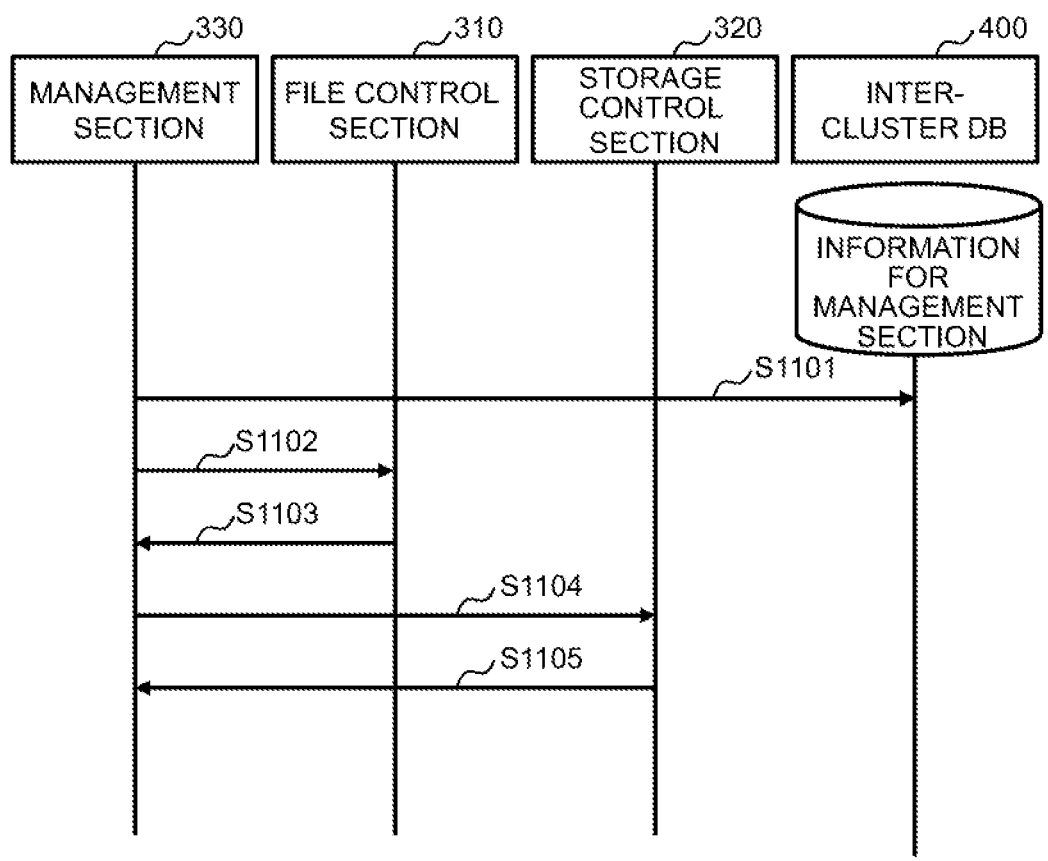
FIG. 11 shows an example of a control procedure according to the first embodiment.

FIG. 11 shows an example of a control procedure for creating a combination (redundant group) of a file control section pair and a storage OS section pair.

In S1101, the management section 330 determines, when the storage system 100 is installed, what kind of redundancy group can be assembled, and stores information on the determined redundancy group in the inter-cluster DB 400. More specifically, the management section 330 stores the storage OS section pair information, the file control section pair information, and the file control section-storage OS section correspondence information from the information on the file control section pair and storage control section pair determined as the redundancy group in the inter-cluster DB 400.

For example, when nodes 120 that belong to the cluster 150 are specified by the system manager, and when the number of nodes in the currently active system is three and the number of nodes in the standby system is one, the management section 330 determines a redundancy group in such a way that a pair of an active-type file control section 310 and an active-type storage OS section 322 is provided in each of the three nodes 120 of the currently active system, and three pairs of a standby-type file control section 310 and a standby-type storage OS section 322 are provided in one node 120 specified in the standby system.

At this point, when the hardware resources for the nodes 120 that belong to the cluster 150 differ from one another, the management section 330 may determine the node 120 having the largest number of hardware resources as the node 120 in the standby system. The management section 330 may further determine the number of nodes 120 in the currently active system and the number of nodes 120 in the standby system in accordance with the number of nodes 120 that belongs to the cluster 150, for example, by providing the number of nodes in the currently active system "N (natural number specified in advance)" and setting the number of nodes "M (natural number specified in advance and smaller than or equal to N)" in the standby system.

In S1102, the management section 330 sets the file control section pair information in the file control section 310. The file control section 310 can thus recognize its own ID allocated to the file control section 310 and recognize the file control section 310 of the counterpart in the file control section pair.

In S1103, the file control section 310 notifies (responds to) the management section 330 that the file control section pair information has been set.

In S1104, the management section 330 sets the storage OS section pair information in the storage control section 320. The storage control section 320 can thus recognize its own ID allocated to the storage control section 320 and recognize the storage OS section 322 of the counterpart in the storage OS section pair.

In S1105, the file control section 310 notifies (responds to) the management section 330 that the storage OS section pair information has been set.

Figure 12:
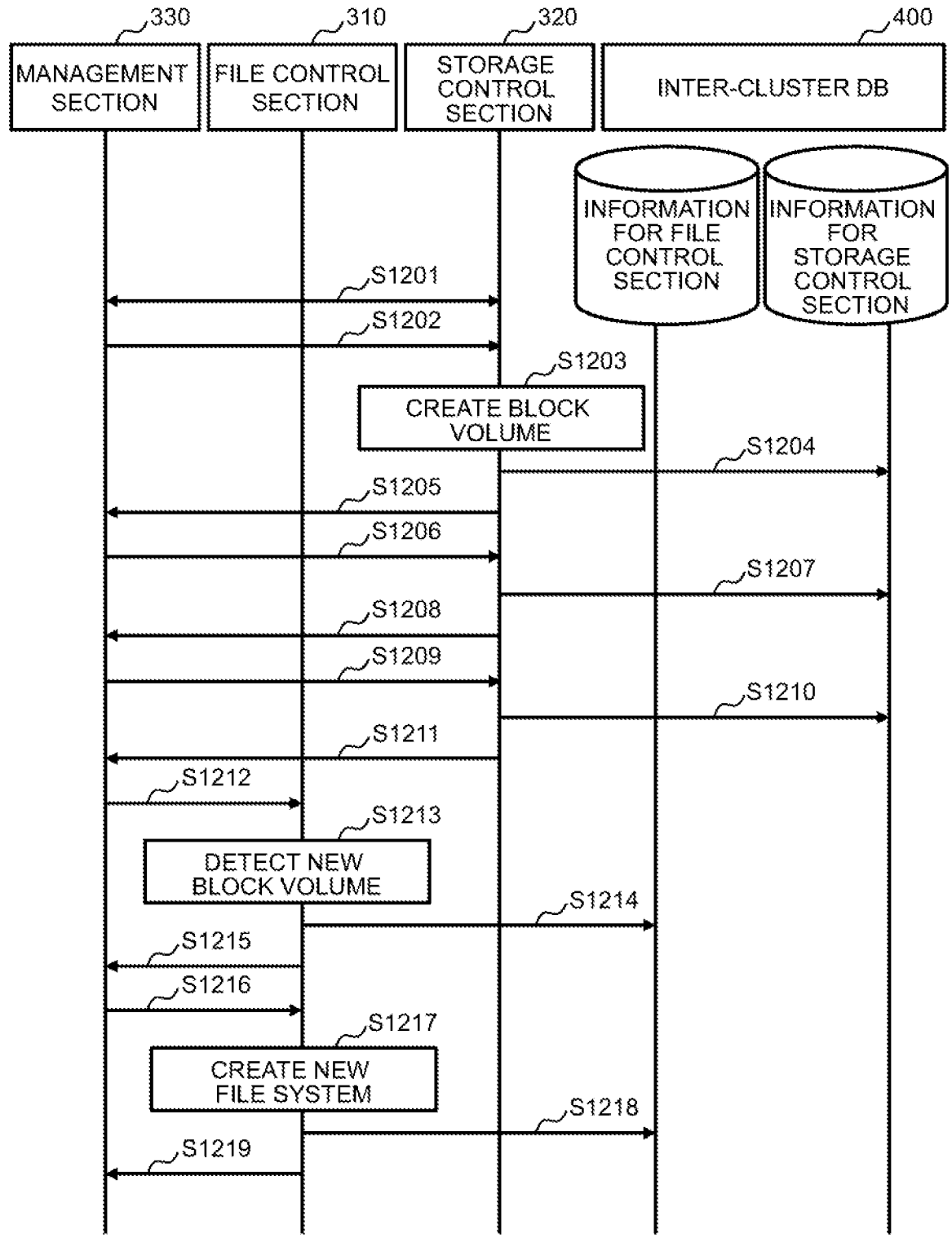
FIG. 12 shows an example of the control procedure according to the first embodiment.

FIG. 12 shows an example of a control procedure for creating a file system. In the control procedure, for example, the capacity of the pool of each of the storage control sections 320 is acquired, and block volumes are so allocated that the pools have the same free capacity. The control procedure starts in response to a trigger issued by the user's instruction from the system manager. The user's instruction may contain information on a type of file system the user desires to create, or may contain information that allows identification of the file control section pair and the storage OS section pair (pair of storage control sections 320) to be processed.

In S1201, the management section 330 inquires of each storage control section 320 how much capacity is available as the pool and acquires the free capacity. Note that the storage control section 320 has pool information representing what kind of storage devices 230 are coupled to the storage control section 320, and how large an assembled pool can be.

In S1202, the management section 330 determines how many block volumes can be created, and issues an instruction to the storage control sections 320 to create block volumes.

In S1203, the storage control sections 320 including active-type storage OS sections 322 create block volumes.

In S1204, the storage control sections 320 including active-type storage OS sections 322 set information on the created block volumes (block volume information) in the inter-cluster DB 400.

In S1205, the storage control sections 320 including active-type storages OS section 322 notify (respond to) the management sections 330 of the creation of the block volumes.

In S1206, the management sections 330 notify the storage control sections 320 including active-type storage OS sections 322 of the file control section-storage OS section correspondence information and instruct the storage control sections 320 to set the connection destination file control section information. That is, since the file control section-storage OS section correspondence information allows determination of which file control section 310 a block volume should be allocated to, the management sections 330 instruct each of the storage control sections 320 to allocate the block volume to the active-type file control section 310 that is a client of the storage control section 320.

In S1207, the storage control sections 320 including active-type storage OS sections 322 generate the connection destination file control section information based on the file control section-storage OS section correspondence information, and set the connection destination file control section information in the inter-cluster DB 400.

In S1208, the storage control sections 320 including active-type storage OS sections 322 notify (respond to) the management sections 330 of the completion of the setting of the connection destination file control section information.

In S1209, the management sections 330 instruct the storage control sections 320 including active-type storages OS section 322 to set paths to the newly created block volumes.

In S1210, the storage control sections 320 including active-type storage OS sections 322 associate the block volumes with the file control sections 310 that access the block volumes in order to establish paths to the new block volumes provided by the storage control sections 320, generate block volume information that specifies the block volume IDs of the block volumes and the access file control section IDs of the file control sections 310, and set the generated block volume information in the inter-cluster DB 400.

In S1211, the storage control sections 320 including active-type storage OS sections 322 notify (respond to) the management sections 330 of the setting of the paths.

As a result of the processes described above, block volumes provided by the storage control sections 320 including active-type storage OS sections 322 are created, and paths are established to the block volumes provided by the storage control sections 320, whereby the storage control sections 320 become operable. Note that setting paths to the block volumes permits access from the file control sections 310 (initiators) corresponding to the access file control section IDs set on a block volume basis.

In S1212, the management sections 330 instruct the active-type file control sections 310 to recognize the created block volumes.

In S1213, the active-type file control sections 310 recognize (detects) the created block volumes. The block volumes provided by the storage control sections 320 are thus visible on the OS as the volumes of the file control sections 310.

In S1214, the active-type file control sections 310 set the recognition block volume information in the inter-cluster DB 400.

In S1215, the active-type file control sections 310 notify (respond to) the management sections 330 of the completion of the setting of the recognition block volume information.

In S1216, the management sections 330 instruct the active-type file control sections 310 to create file systems specified by the user's instruction on the recognized block volumes.

In S1217, the active-type file control sections 310 execute a predetermined command to create file systems on the recognized block volumes.

In S1218, the active-type file control sections 310 set the file system information on created file system in the inter-cluster DB 400.

In S1219, the active-type file control sections 310 notify (respond to) the management sections 330 of the completion of the setting of the file system information.

As a result of the processes described above, block volumes provided by the storage control sections 320 including active-type storage OS sections 322 are recognized, and file systems are created on the block volumes, whereby the file control sections 310 become operable.

Figure 13:
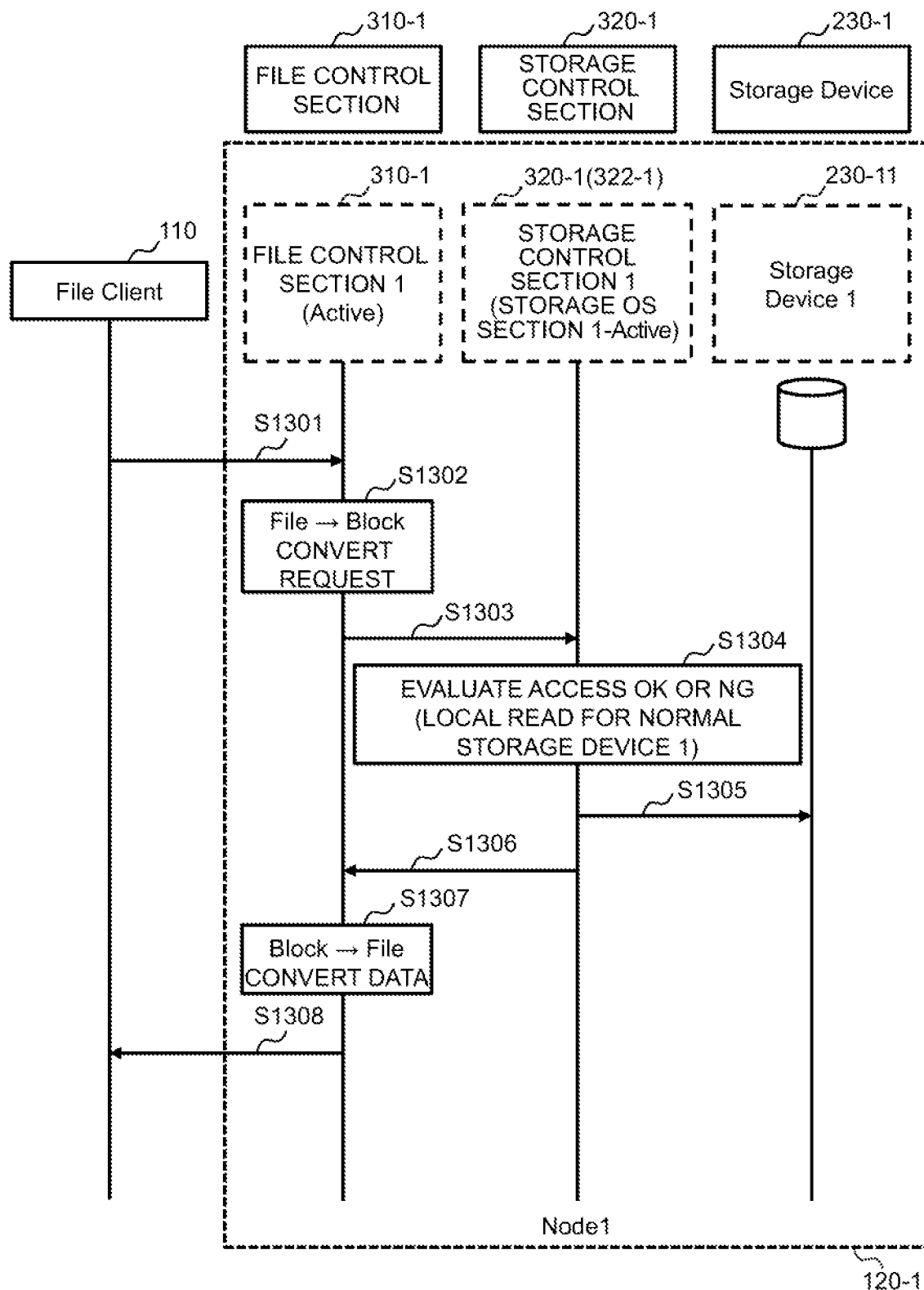
FIG. 13 shows an example of the control procedure according to the first embodiment.

FIG. 13 shows an example of a read process control procedure under normal conditions. FIG. 13 describes the read process with reference to a case where a read request on a file basis is issued from a file client 110 to an active file control section.

In S1301, the active file control section receives the read request on a file basis from the file client 110.

In S1302, the active file control section performs request conversion. For example, the active file control section refers to a table (not shown) that associates a file to a block (storage position) in the block volume to identify which block the file corresponds to the file, and converts the read request on a file basis into a read request on a block basis.

In S1303, the active file control section notifies the storage control section 320-1 including the active storage OS section of the read request on a block basis.

In S1304, the storage control section 320-1 performs accessibility evaluation. More specifically, the storage control section 320-1 refers to a record corresponding to the redundancy group to which the active file control section and the active storage OS section belong by using the redundant data accessibility table 630, and evaluates the accessibility of the first component in the record. When the accessibility of the first component in the record is "accessible", the storage control section 320-1 identifies the storage device 230 specified in the first component and determines the accessibility as "accessible". When the accessibility of the first component in the record is "inaccessible", the storage control section 320-1 evaluates the accessibility of the second component. When the accessibility of the second component is "accessible", the storage control section 320-1 identifies the storage device 230 specified by the second component and determines the accessibility as "accessible". When the accessibility of the second component is "inaccessible", the storage control section 320-1 may identify that there is no accessible (readable) storage device 230 (error) and determine the accessibility as "inaccessible".

For example, when the active file control section and the active storage OS section belong to a "redundancy group 1", the storage control section 320-1 refers to the redundant data accessibility table 630 and determines that the storage device 230-11 is accessible.

In S1305, the storage control section 320-1 reads data from the storage device 230 determined to be "accessible". In the present example, since the storage device 230-11 is "accessible", the storage control section 320-1 reads (locally reads) data from the storage device 230-11.

In S1306, the storage control section 320-1 notifies the active file control section (respond to block I/O) of the completion of the reading of the read data on a block basis (hereinafter referred to as "block data").

In S1307, the active file control section performs data conversion. In the data conversion, the block data is converted into data on a file basis (hereinafter referred to as "file data").

In S1308, the active file control section notifies the file client 110 (respond to file I/O) of the file data and the completion of the reading.

Figure 14:
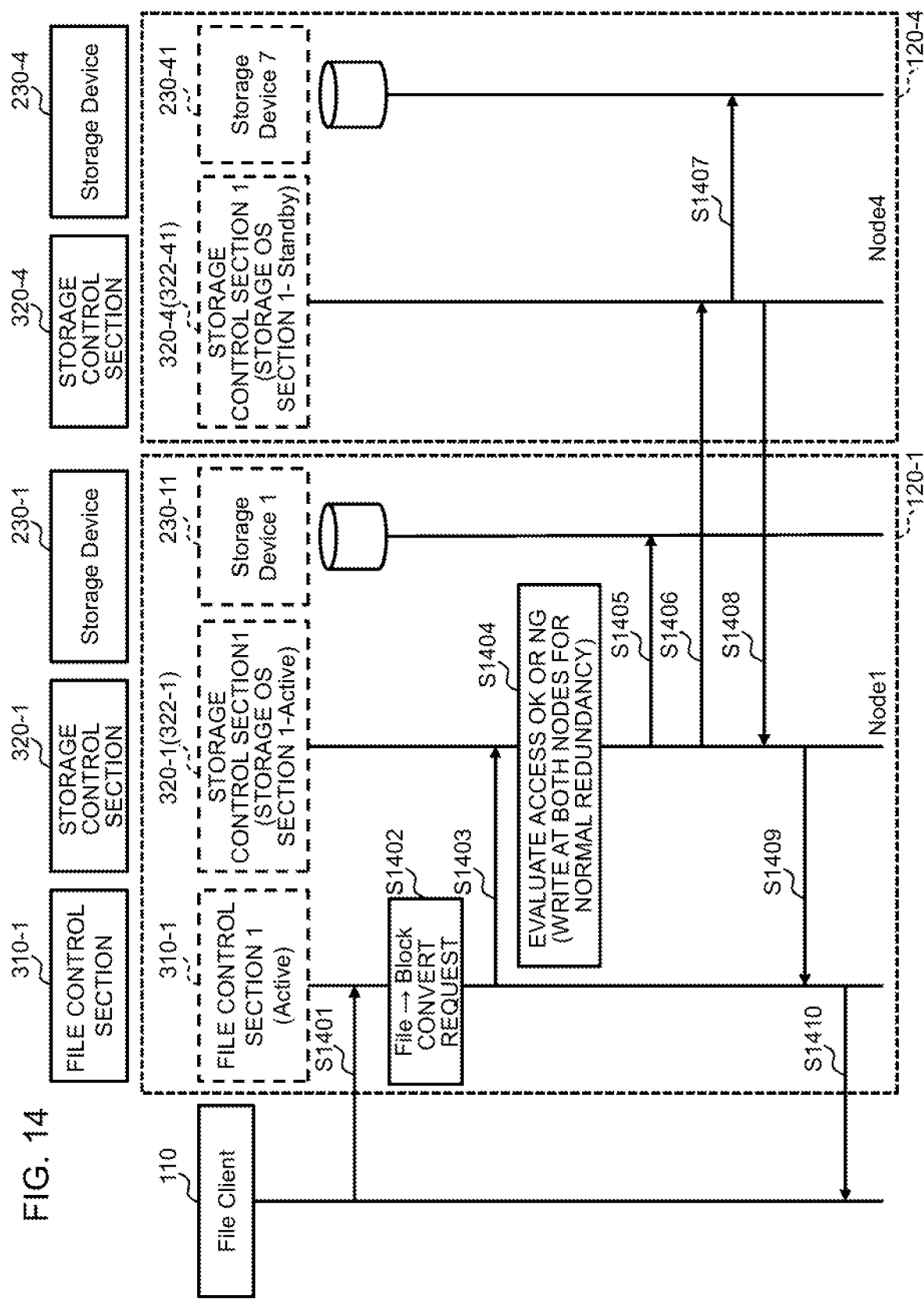
FIG. 14 shows an example of the control procedure according to the first embodiment.

FIG. 14 shows an example of a write process control procedure under normal conditions. FIG. 14 describes the write process with reference to a case where a write request on a file basis is issued from a file client 110 to an active file control section.

In S1401, the active file control section receives the write request on a file basis from the file client 110.

In S1402, the active file control section performs request conversion. For example, the active file control section refers to a table (not shown) that associates a file to a block (storage position) in a block volume to identify which block the file corresponds to, and converts the write request on a file basis into a write request on a block basis.

In S1403, the active file control section notifies the storage control section 320-1 including an active storage OS section of the write request on a block basis.

In S1404, the storage control section 320-1 performs accessibility evaluation. More specifically, the storage control section 320-1 refers to a record corresponding to the redundancy group to which the active file control section and the active storage OS section belong by using the redundant data accessibility table 630, and evaluates the accessibility of the first component. When the accessibility of the first component in the record is "accessible", the storage control section 320-1 identifies the storage device 230 specified in the first component and determines the accessibility as "accessible". The storage control section 320-1 further evaluates the accessibility of the second component. When the accessibility of the second component is "accessible", the storage control section 320-1 identifies the storage device 230 specified by the second component and determines the accessibility as "accessible". When the accessibility of the first component and the accessibility of the second component are both "inaccessible", the storage control section 320-1 may identify that there is no accessible (writable) storage device 230 (error) and determine the accessibilities as "inaccessible".

For example, when the active file control section and the active storage OS section belong to the "redundancy group 1", the storage control section 320-1 refers to the redundant data accessibility table 630 and determines that the storage device 230-11 and the storage device 230-41 are accessible.

In S1405 and S1406, the storage control section 320-1 writes data to the storage device 230 determined to be "accessible". In the present example, since the storage device 230-11 is "accessible", the storage control section 320-1 writes (locally writes) data to the storage device 230-11 (S1405). Since the storage device 230-41 is "accessible", the storage control section 320-1 transmits a write command on a pool configuration volume basis to the storage control section 320-4 including a standby storage OS section to write data (redundant write) to the storage device 230-41 in the node 120-4 (S1406).

In S1407, the storage control section 320-4 writes (locally writes) data to the storage device 230-41.

In S1408, the storage control section 320-4 transmits (responds) to storage control section 320-1 including an active storage OS section the completion of the writing to the storage device 230-41.

In S1409, the storage control section 320-1 notifies the active file control section of the completion of the writing of the data on a block basis (responds to block I/O).

In S1410, the active file control section transmits to the file client 110 (responds to file I/O) the completion of the writing of the data on a file basis.

Figure 15:
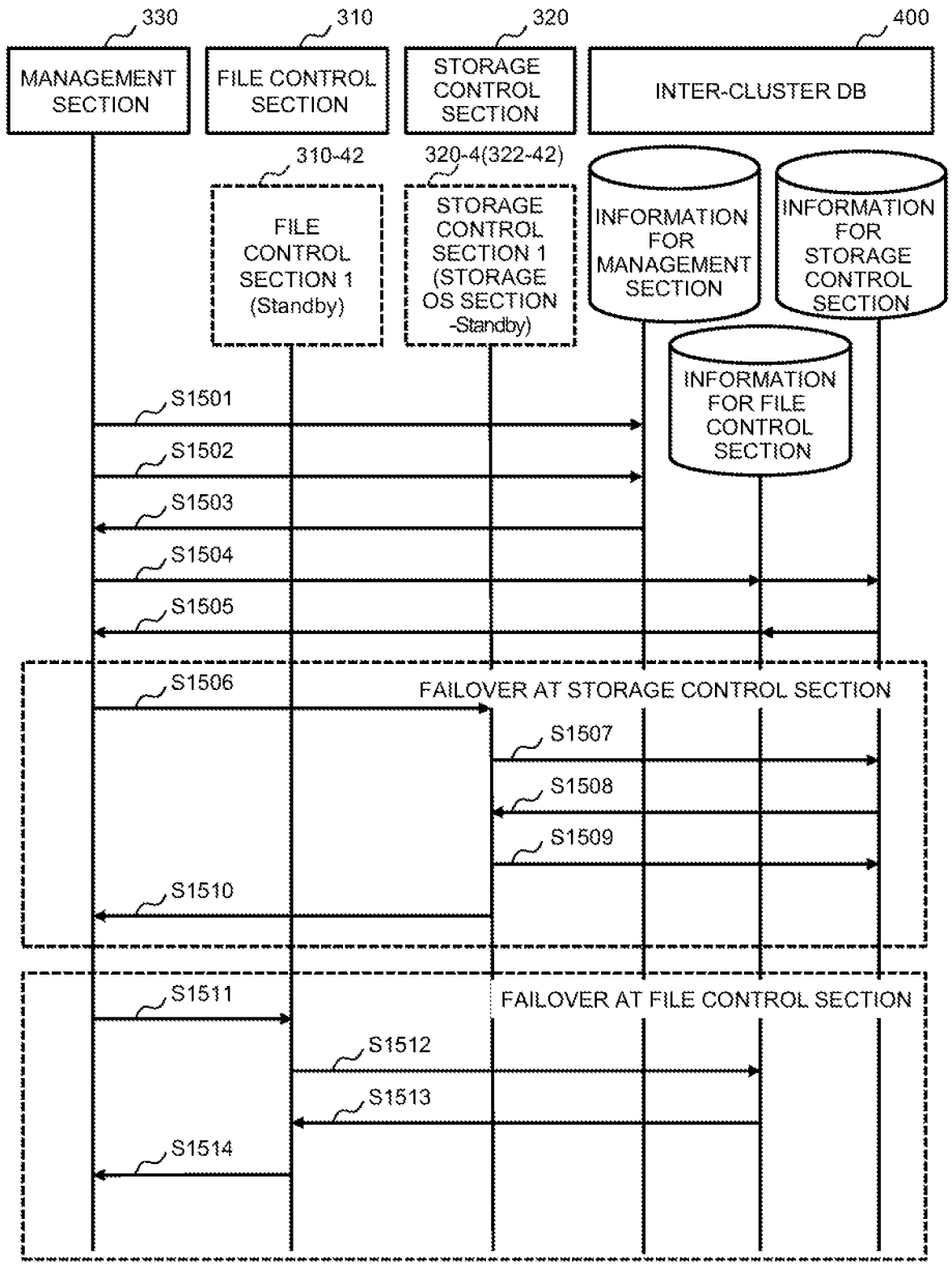
FIG. 15 shows an example of the control procedure according to the first embodiment.

FIG. 15 shows an example of a failover control procedure in the event of occurrence of failure in the node 120-1. A primary element that detects the failed node 120 is not limited to a specific element. The failed node 120 itself may detect the failure, another node 120 may detect the failure, the management node may detect the failure, or any other means may detect the failure.

In S1501, the management section 330 updates the management section information 410 in the inter-cluster DB 400. More specifically, the management section 330 changes the state 542 of a record showing the node ID 541 in the node state table 540 is "Node 1" from "normal" to "blocked".

In S1502 and S1503, the management section 330 checks the number of failed nodes 120 (failover count). For example, the management section 330 refers to the management section information 410 (node state table 540, for example), and when the failover count is "1", the management section 330 transitions to the process in S1504, whereas when the failover count is greater than or equal to "2", the management section 330 terminates the entire procedure.

In S1504 and S1505, the management section 330 identifies a failover target file control section 310 and storage control section 320.

More specifically, the management section 330 refers to the storage OS section pair table 520, searches for a record showing that the active node 522 is "Node 1", and identifies the storage OS section ID 521 "storage OS section 1" and the standby node 523 "Node 4" (standby storage OS section) in the record. The management section 330 further refers to the file control section pair table 510, searches for a record showing that the active node 512 is "Node 1", and identifies the file control section ID 511 "file control section 1" and the standby node 513 "Node 4" (standby file control section) in the record.

In S1506, the management section 330 notifies the storage control section 320-4 including a standby storage OS section of a failover instruction.

In S1507 and S1508, the storage control section 320-4 acquires the block volume information and the connection destination file control section information used by the active storage OS section from the storage control section information 420, and creates a block volume in the same manner as the active storage OS section does, and achieves an I/O ready state in which processes relating to block service can be carried out.

In S1509, the storage control section 320-4 updates the storage control section information 420. More specifically, the storage control section 320-4 refers to the redundant data accessibility table 630 in the storage control section information 420, and identifies a record showing the storage device 230 of the first component 632 or the second component 633 includes the storage device 230-11 in the node 120-1. In the present example, the storage control section 320-4 identifies a record showing that the redundancy group ID 631 is the "redundancy group 1". In this case, the storage control section 320-4 sets the accessibility of the first component 632 in the record showing the "redundancy group 1" as "inaccessible".

In S1510, the storage control section 320-4 notifies (responds to) the management section 330 of the completion of the failover for the storage control section 320-4.

In S1511, the management section 330 notifies the standby file control section of the failover instruction.

In S1512 and S1513, the standby file control section achieves an I/O ready state in which processes relating to file service can be carried out, for example, by acquiring the file system information owned by the active file control section from the file control section information 430, detecting the created block volume, or creating a file system in the created block volume.

In S1514, the standby file control section notifies (responds to) the management section 330 of the completion of the failover for the standby file control section.

Figure 16:
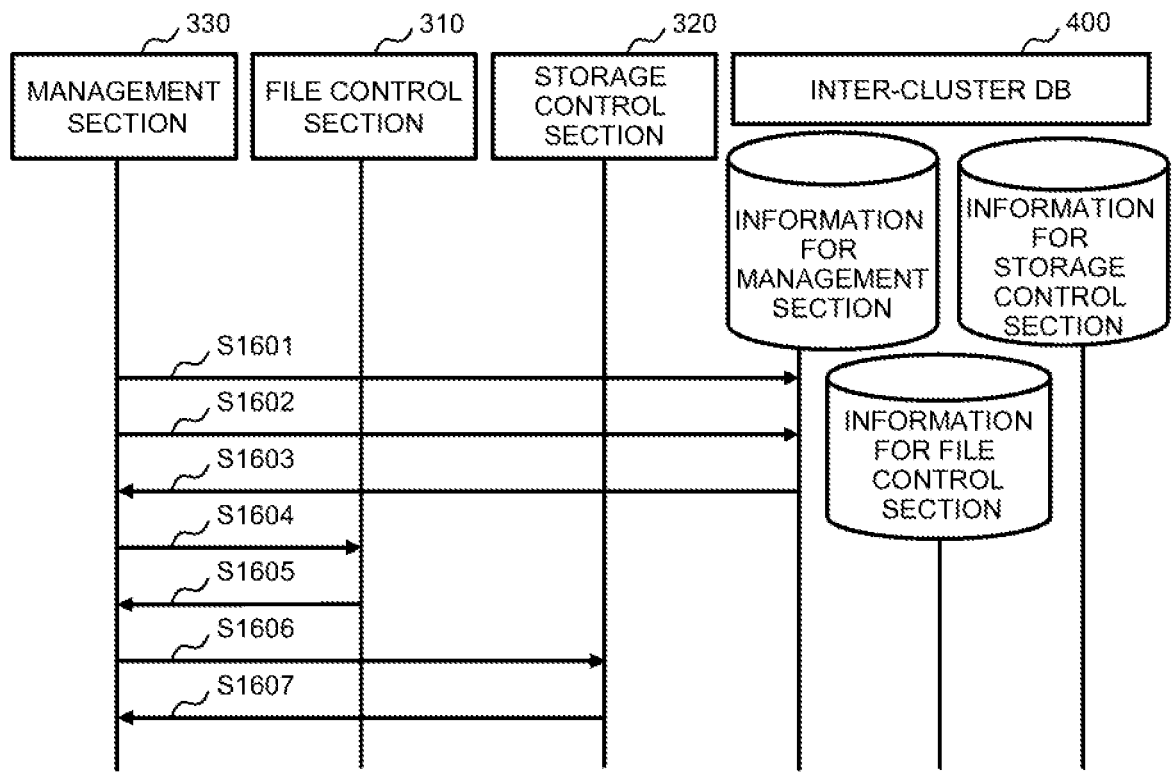
FIG. 16 shows an example of the control procedure according to the first embodiment.

FIG. 16 shows an example of the failover control procedure performed when failure occurs in the node 120-1 in the event of failure occurring in the node 120-2 (failover for second node).

In S1601, the management section 330 updates the management section information 410 in the inter-cluster DB 400. More specifically, the management section 330 changes the state 542 of the record showing the node ID 541 in the node state table 540 is "Node 1" from "normal" to "blocked".

In S1602 and S1603, the management section 330 checks the failover count. For example, the management section 330 refers to the management section information 410 (node state table 540, for example), and when the failover count is "2", the management section 330 transitions to the process in S1604, whereas when the failover count is not "2", the management section 330 terminates the entire procedure.

In S1604, the management section 330 notifies an instruction of blockage of the file service cluster 801 to the active-type file control section 310 that belongs to the cluster 801 and the operating standby-type file control section 310 that belongs to the cluster 801.

In S1605, the file control section 310 having received the notification in S1604 notifies (responds to) the management section 330 of the completion of the blockage of the cluster 801 (no acceptance of file I/O request from file client 110, for example).

In S1606, the management section 330 notifies an instruction of blockage of the block service cluster 802 to the storage control section 320 including the active-type storage OS section 322 that belongs to the cluster 802 and the storage control section 320 including the operating standby-type storage OS section 322 that belongs to the cluster 802.

In S1607, the storage control section 320 having received the notification in S1606 notifies (responds to) the management section 330 of the completion of the blockage of the cluster 802 (inaccessible to storage devices 230, for example).

Figure 17:
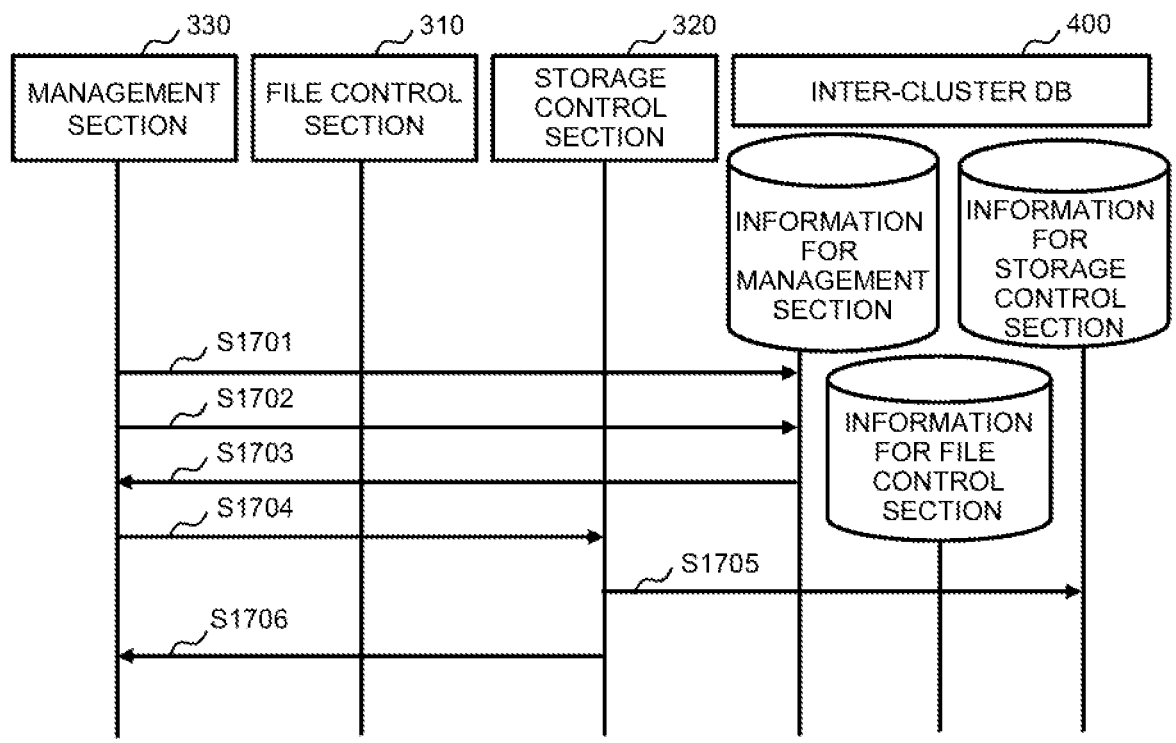
FIG. 17 shows an example of the control procedure according to the first embodiment.

FIG. 17 shows an example of the failover control procedure in the event of occurrence of failure in a node 120 in the standby system (node 120-4, for example).

In S1701, the management section 330 updates the management section information 410 in the inter-cluster DB 400. More specifically, the management section 330 changes the state 542 of a record showing that the node ID 541 in the node state table 540 is "Node 4" from "normal" to "blocked".

In S1702 and S1703, the management section 330 checks whether the failed node 120-4 is a node 120 in the standby system. For example, the management section 330 refers to the management section information 410 (file control section pair table 510, storage OS section pair table 520, for example), transitions to the process in S1704 when the management section 330 determines that the failed node 120-4 is a node 120 in the standby system, or terminates the entire procedure when the management section 330 determines that the failed node 120-4 is not a node 120 of the standby system.

In S1704, the management section 330 instructs the storage control section 320 including an active-type storage OS section 322 to stop the redundancy operation.

In S1705, the storage control section 320 having received the instruction in S1704 updates the storage control section information 420. For example, the storage control section 320 refers to the redundant data accessibility table 630 and changes the accessibility of the second component 633 in a record of the redundancy group to which the storage control section 320 belongs from "accessible" to "inaccessible.

In S1706, the storage control section 320 having received the instruction in S1704 notifies (responds to) the management section 330 of the update of the storage control section information 420 (stoppage of redundancy, for example).

In the nodes 120 in the standby system, the memory 220 may be allocated to each of the standby-type file control sections 310, or when failure occurs in any of the plurality of nodes 120 in the currently active system, the memory 220 may be allocated to the standby-type file control section 310 paired with the active-type file control section 310 in the failed node 120.

Figure 18:
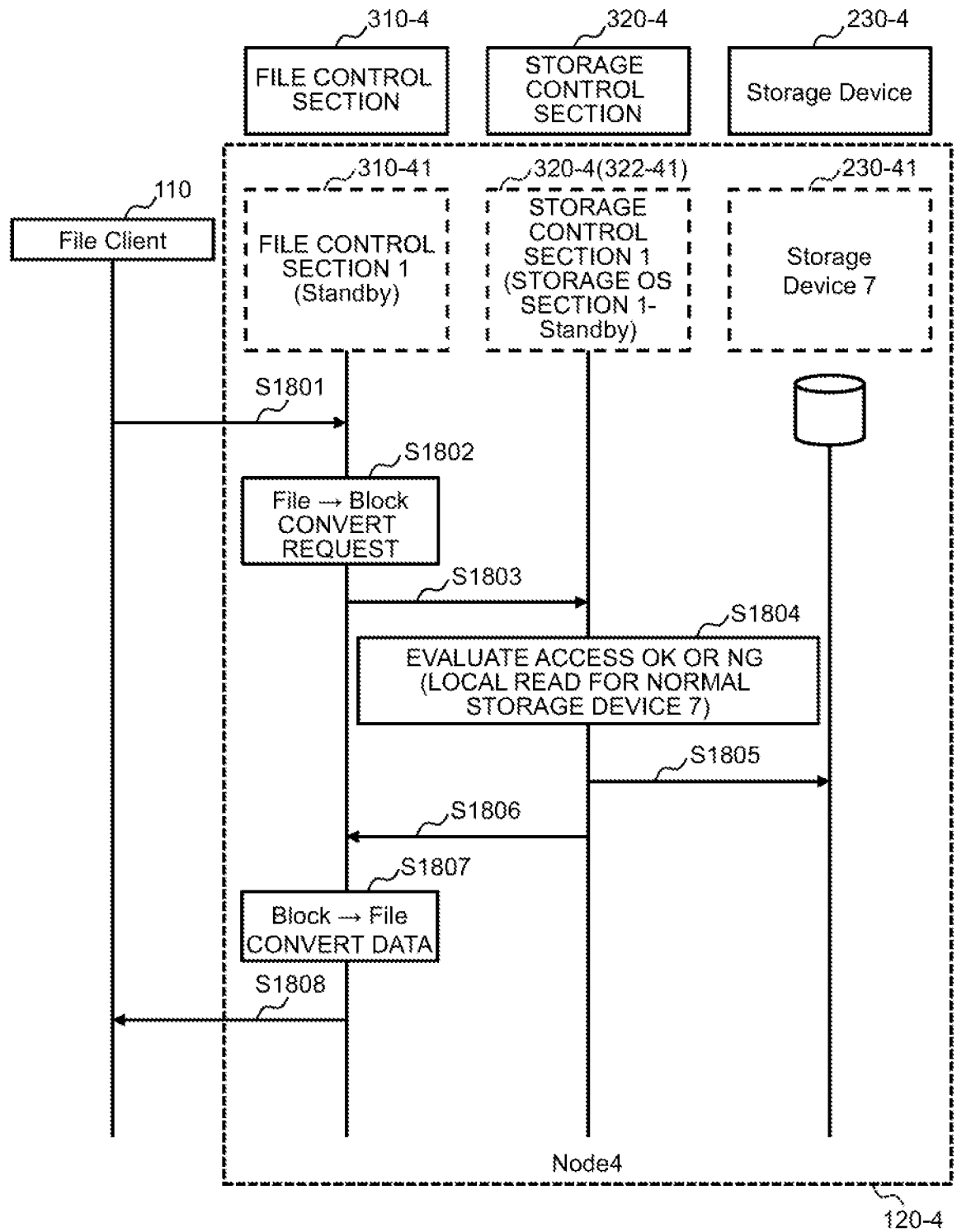
FIG. 18 shows an example of the control procedure according to the first embodiment.

FIG. 18 shows an example of a read process control procedure after failover is performed. FIG. 18 describes the read process with reference to a case where a read request on a file basis is issued from a file client 110 to a standby file control section.

In S1801, the standby file control section receives the read request on a file basis from the file client 110.

In S1802, the standby file control section performs request conversion. The request conversion is the same as that in S1302 and will not be described.

In S1803, the standby file control section notifies the storage control section 320-4 including a standby storage OS section of the read request on a block basis.

In S1804, the storage control section 320-4 performs accessibility evaluation. The accessibility evaluation is the same as that in S1304 and will not be described.

In S1805, the storage control section 320-4 reads data from the storage device 230 determined to be "accessible". In the present example, since the storage device 230-41 is "accessible", the storage control section 320-4 reads (locally reads) data from the storage device 230-41.

In S1806, the storage control section 320-4 notifies the standby file control section of the block data and the completion of the reading (responds to block I/O).

In S1807, the standby file control section performs data conversion. In the data conversion, the block data is converted into file data.

In S1808, the standby file control section notifies the file client 110 (responds to file I/O) of the file data and the completion of the reading.

Figure 19:
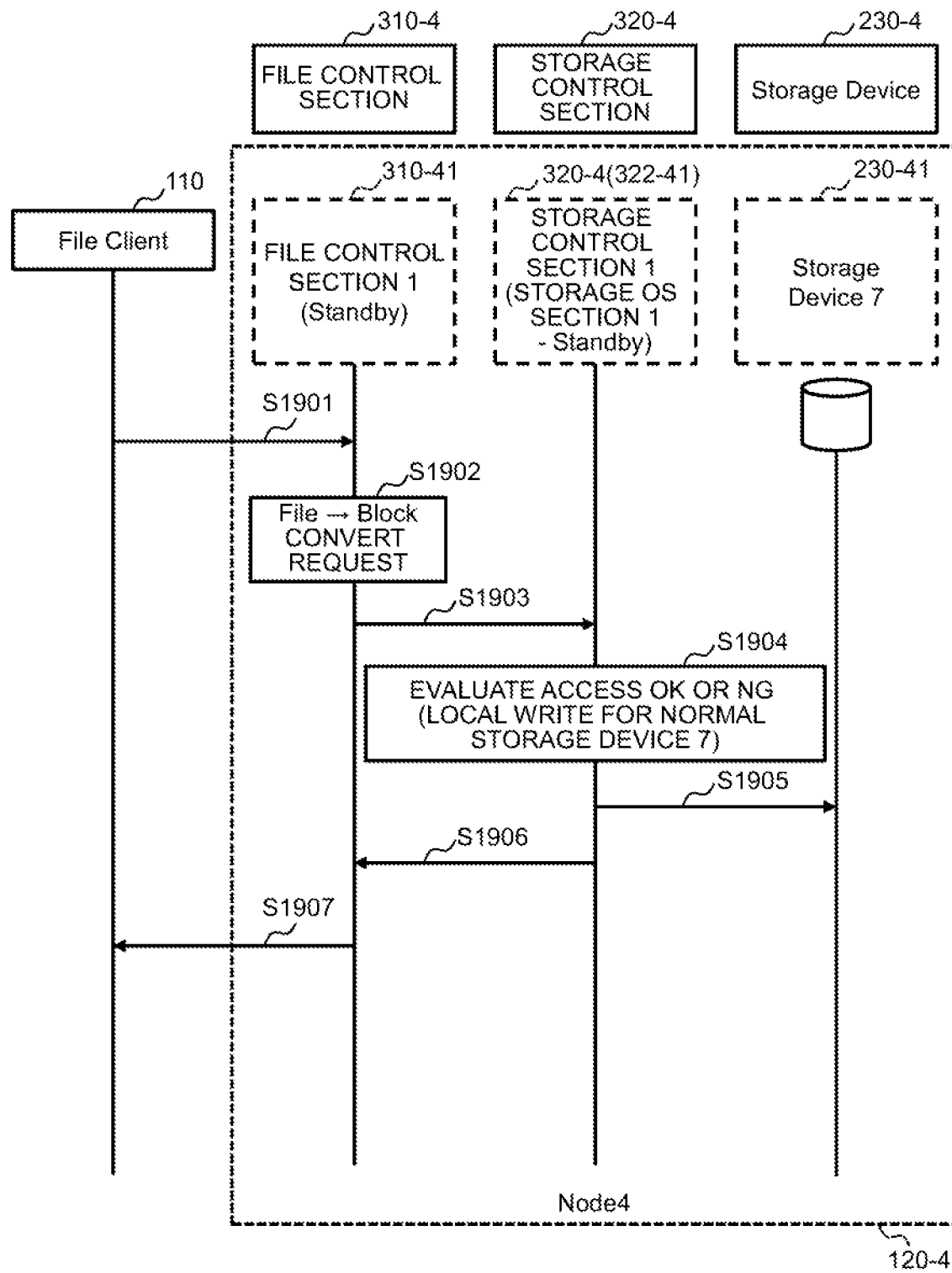
FIG. 19 shows an example of the control procedure according to the first embodiment.

FIG. 19 shows an example of a write process control procedure after failover is performed. FIG. 19 describes the write process with reference to a case where a write request on a file basis is issued from a file client 110 to a standby file control section.

In S1901, the standby file control section receives the write request on a file basis from the file client 110.

In S1902, the standby file control section performs request conversion. The request conversion is the same as that in S1402 and will not be described.

In S1903, the standby file control section notifies the storage control section 320-4 including a standby storage OS section of the write request on a block basis.

In S1904, the storage control section 320-4 performs accessibility evaluation. The accessibility evaluation is the same as that in S1404 and will not be described. In the present example, since the storage device 230-11 is "inaccessible" and the storage device 230-41 is "accessible", the storage control section 320-4 writes (locally writes) data to the storage device 230-41.

In S1905, the storage control section 320-4 writes data to the storage device 230 determined to be "accessible".

In S1906, the storage control section 320-4 notifies the standby file control section of the completion of the writing of the data on a block basis (responds to block I/O).

In S1907, the standby file control section transmits to the file client 110 (responds to file I/O) the completion of the writing of the data on a file basis.

In the present embodiment, providing a single node 120 with the file control section pair and the storage OS section pair allows the respective failover destinations to be the same node 120 in the event of occurrence of failure in the node 120, whereby the straight configuration can be maintained.

In the present embodiment, when a node 120 is applied, for example, to a personal computer, the program for the control described above can be provided in the form of a recording medium such as a CD-ROM, or data signals over the Internet or any other network.

Figure 20:
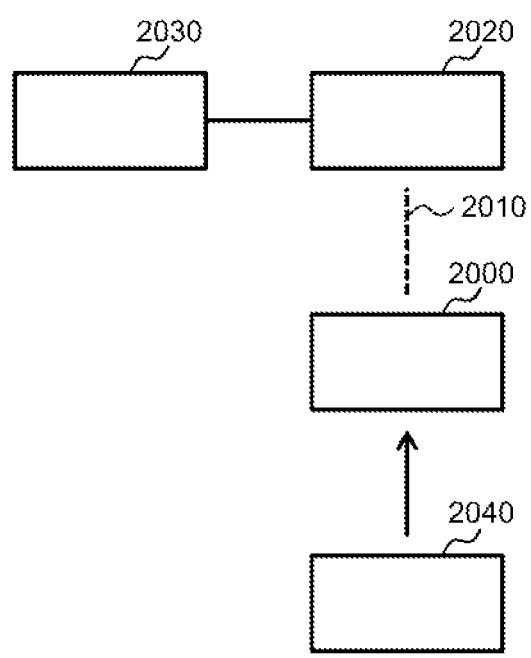
FIG. 20 shows an example of an aspect in which a program is provided according to the first embodiment.

FIG. 20 shows an example of an aspect in which the program is provided.

A personal computer 2000 receives the program provided via a CD-ROM 2040. The personal computer 2000 has the function of coupling itself to a communication line 2010. The computer 2020 is a server computer that provides the program described above and stores the program on a hard disk drive 2030 or any other recording medium. The communication line 2010 is the Internet, PC communication or any other communication line, or a dedicated communication line. The computer 2020 uses the hard disk drive 2030 to read the program and transmits the program via the communication line 2010 to the personal computer 2000. That is, the program is transmitted as a data signal via a carrier wave and through the communication line 2010. The program can thus be supplied as a computer readable computer program product in a variety of forms, such as a recording medium and a data signal (carrier wave).

(2) Additional Remarks

The embodiment described above includes, for example, the contents below.

The aforementioned embodiment has been described above with reference to the case where the present invention is applied to a system, but not necessarily, and the present invention can be widely applied to a variety of other systems, devices, methods, and programs.

In the embodiment described above, for example, one function of each of the nodes 120 (such as file control section 310 and storage control section 320) may be divided into a plurality of functions, or a plurality of functions of each of the nodes 120 may be combined with one another into a single function. Part of the functions of each of the nodes 120 may be provided as other functions or provided as part of other functions. Part of the functions of each of the nodes 120 may be achieved by another computer that can communicate with the node 120.

In the embodiment described above, the configuration of each of the tables is presented by way of example, and one table may be divided into two or more tables, or all or part of two or more tables may be integrated into one table.

In the above description, programs, tables, files, and other pieces of information that achieve the functions can be stored in a memory, a hard disk drive, an SSD (solid state drive), or any other storage device, or an IC card, an SD card, a DVD, or any other recording medium.

The embodiment described above, for example, have the following characteristic configurations.

(1)

There is provided a storage system in which a plurality of nodes that provide file service for performing I/O on a file basis and block service for performing I/O on a block basis (nodes 120, for example) are coupled with each other via a network (storage system 100, for example). The plurality of nodes described above each include a storage device that stores data (storage device 230, for example), a file processing section that accepts a file I/O request from a file client (file client 110, for example) and converts the file I/O request described above into a block I/O request (such as file control section 310, VM, and circuit) in the file service described above, and a block processing section that carries out a process for performing I/O from/to the storage device described above based on the block I/O request described above (such as storage control section 320, storage OS section 322, VM, and circuit) in the block service described above. The plurality of nodes described above include a node in a currently active system (node 120-1, for example) and a node in a standby system (node 120-4, for example). The plurality of nodes described above each further include a management section that manages the file processing section of the node described above in the currently active system and the file processing section of the node described above in the standby system as a pair, sets the file processing section of the node described above in the currently active system to be operational, manages the block processing section of the node described above in the currently active system and the block processing section of the node described above in the standby system as a pair, and sets the block processing section of the node described above in the currently active system to be operational (such as management section 330, VM, circuit, and management node).

In the configuration described above, for example, the file processing section and the block processing section are paired with each other and placed in the same physical node, so that internal communication is performed between the file processing section and the block processing section, and the number of inter-node communications can be suppressed in the cooperation between file service and the block service. Furthermore, in the configuration described above, for example, the node in the currently active system and the node in the standby system are provided separately from each other, so that hardware resources for the node in the currently active system do not need to be allocated for the node in the standby system, whereby the processing performance of the node in the currently active system can be enhanced. For example, separating the node in the currently active system from the node in the standby system allows part of the resources originally used for the standby system to be allocated to the file processing section in the currently active system, whereby the performance of IO processing is improved. Furthermore, for example, when three nodes in the currently active system are each provided with the file processing section and the block processing section in the standby system that correspond to another node in the currently active system, the hardware resources equivalent to six nodes are required, but providing a node dedicated to the standby system allows reduction to hardware resources for four nodes, whereby the cost can be reduced.

(2)

The node in the currently active system described above is formed of a plurality of nodes (node 120-1 to node 120-3, for example), and the node described above in the standby system is provided with the file processing sections (file control sections 310-41 to file control sections 310-43, for example) and the block processing sections (storage OS sections 322-41 to storage OS section 322-43, for example) that are respectively paired with the file processing sections and the block processing sections of the plurality of nodes described above in the currently active system (see FIG. 8, for example).

In the configuration described above, the file processing sections and the block processing sections that are paired with those in the currently active system are collectively provided in the node in the standby system, whereby the cost can be reduced as compared, for example, with a case where a plurality of nodes are provided in the standby system in correspondence with the plurality of nodes in the currently active system. For example, when the nodes in the standby system are provided in correspondence with the three nodes in the currently active system, the hardware resources equivalent to six nodes are required, but providing a node dedicated to the standby system allows reduction to hardware resources for four nodes, whereby the cost can be reduced.

(3)

The number of hardware resources for the node described above in the standby system is greater than the number of hardware resources for any of the plurality of nodes described above in the currently active system.

Even when failover causes the file processing section and the block processing section in the standby system to operate as those in the currently active system, the node in the standby system needs hardware resources that can perform, for example, redundancy of data handled by other block processing sections in the standby system. According to the configuration described above, the number of hardware resources for each of the nodes in the currently active system can be smaller than the number of hardware resources for the node in the standby system, whereby the hardware resources can be effectively used, and the cost can be suppressed.

(4)

In the node described above in the standby system, when failure occurs in any of the plurality of nodes described above in the currently active system, a memory (memory 220, for example) is allocated to the file processing section paired with the file processing section of the failed node described above.

According to the configuration described above, for example, the necessity of over-provisioning, in which excessive memory capacity is allocated in anticipation of the future, can be eliminated.

(5)

The management section described above manages node state information (node state table 540, for example) representing states of the nodes. When failure occurs in any of the plurality of nodes described above in the currently active system, the management section stores information representing that the node described above is blocked in the node state information described above, and refers to the node state information described above. When the number of failed nodes is one, the management section sets the file processing section of the node in the standby system that is paired with the file processing section of the failed node described above to be operational, and sets the block processing section of the node described above in the standby system that is paired with the block processing section of the failed node described above to be operational (see FIG. 15, for example).

According to the configuration described above, for example, when failover is performed, internal communication is performed between the file processing section and the block processing section of the node in the standby system, whereby the number of communications between the nodes can be reduced in the cooperation between the file service and the block service.

(6)

The node in the standby system described above is provided with hardware resources that can operate one pair of a file processing section and a block processing section, and the management section described above refers to the node state information described above. When the number of failed nodes is two, the management section instructs the file processing sections and the block processing sections of the nodes where no failure has occurred, out of the plurality of nodes described above in the currently active system, not to perform the process, and instructs the file processing sections and the block processing sections, which are during operation, of the node described above in the standby system not to perform the process (see FIG. 16, for example).

According to the configuration described above, for example, two or more pairs of the file control section and the block processing section of the node in the standby system can be operated to avoid, for example, insufficient hardware resources for the node in the standby system, which results in deterioration in data integrity and responsiveness.

(7)

When accepting a file I/O request from the file client, the file processing section of the node described above in the currently active system converts the file I/O request described above into a block I/O request (see S1402, for example). The block processing section of the node described above in the currently active system carries out the process for performing I/O from/to the storage device of the node described above in the currently active system based on the block I/O request described above (S1405, for example), and instructs the block processing section of the node described above in the standby system that is paired with the block processing section, described above, of the node in the currently active system to make data redundant so as to perform I/O from/to the storage device of the node described above in the standby system based on the block I/O request described above (S1406, for example). When failure occurs in the node described above in the standby system, the management section described above instructs the block processing section of the node described above in the currently active system to stop making the data redundant (see FIG. 17, for example).

According to the configuration described above, for example, when failure occurs in the node in the standby system and data cannot therefore be made redundant, the block processing section of the node in the currently active system does not instruct the block processing section of the node in the standby system to make the data redundant, whereby the number of communications between the nodes can be reduced.

The configurations described above may be changed, recombined, combined, or omitted as appropriate to the extent that any of the operations does not depart from the substance of the present invention.

It should be understood that items contained in a list in the form "at least one of A, B, and C" mean (A), (B), (C), (A and B), (A and C), (B and C) or (A, B, and C). Similarly, items contained in a list in the form of "at least one of A, B, or C" can mean (A), (B), (C), (A and B), (A and C), (B and C) or (A, B, and C).

What is claimed is:

1. A storage system in which a plurality of nodes that provide file service for performing I/O (input/output) on a file basis and block service for performing I/O on a block basis are coupled with each other via a network,
   wherein the plurality of nodes each include a storage device that stores data, a file processing section that accepts a file I/O request from a file client and converts the file I/O request into a block I/O request in the file service, and a block processing section that carries out a process for performing I/O from/to the storage device based on the block I/O request in the block service,
   the plurality of nodes include a node in a currently active system and a node in a standby system,
   the storage system further include a management section that manages the file processing section of the node in the currently active system and the file processing section of the node in the standby system as a pair, sets the file processing section of the node in the currently active system to be operational, manages the block processing section of the node in the currently active system and the block processing section of the node in the standby system as a pair, and sets the block processing section of the node in the currently active system to be operational;
   wherein the node in the currently active system is formed of a plurality of nodes,
   the node in the standby system is provided with the file processing sections and the block processing sections that are respectively paired with the file processing sections and the block processing sections of the plurality of nodes in the currently active system; and
   wherein the management section manages node state information representing states of the nodes, when failure occurs in any of the plurality of nodes in the currently active system, the management section stores information representing that the node is blocked in the node state information, and refers to the node state information, when the number of failed nodes is one, the management section sets the file processing section of the node in the standby system that is paired with the file processing section of the failed node to be operational, and sets the block processing section of the node in the standby system that is paired with the block processing section of the failed node to be operational.

2. The storage system according to claim 1,
   wherein the number of hardware resources for the node in the standby system is greater than the number of hardware resources for any of the plurality of nodes in the currently active system.

3. The storage system according to claim 1, wherein in the node in the standby system, when failure occurs in any of the plurality of nodes in the currently active system, a memory is allocated to the file processing section paired with the file processing section of the failed node.

4. The storage system according to claim 1, wherein the management section refers to the node state information, when the number of failed nodes is two, the management section instructs the file processing sections and the block processing sections of the nodes where no failure has occurred, out of the plurality of nodes in the currently active system, not to perform the process, and instructs the file processing sections and the block processing sections, which are during operation, of the node in the standby system not to perform the process.

5. The storage system according to claim 1, wherein when accepting a file I/O request from the file client, the file processing section of the node in the currently active system converts the file I/O request into a block I/O request,
the block processing section of the node in the currently active system carries out the process for performing I/O from/to the storage device of the node in the currently active system based on the block I/O request, and instructs the block processing section of the node in the standby system that is paired with the block processing section of the node in the currently active system to make data redundant so as to perform I/O from/to the storage device of the node in the standby system based on the block I/O request, and
when failure occurs in the node in the standby system, the management section instructs the block processing section of the node in the currently active system to stop making the data redundant.

6. A cooperation method for causing file service for performing I/O (input/output) on a file basis and block service for performing I/O on a block basis to cooperate with each other in a storage system in which a plurality of nodes that provide the file service and the block service are coupled with each other via a network,
wherein the plurality of nodes each include a storage device that stores data, a file processing section that accepts a file I/O request from a file client and converts the file I/O request into a block I/O request in the file service, and a block processing section that carries out a process for performing I/O from/to the storage device based on the block I/O request in the block service,
the plurality of nodes include a node in a currently active system and a node in a standby system, and
the method comprising, by a management section,
managing the file processing section of the node in the currently active system and the file processing section of the node in the standby system as a pair,
setting the file processing section of the node in the currently active system to be operational,
managing the block processing section of the node in the currently active system and the block processing section of the node in the standby system as a pair, and
setting the block processing section of the node in the currently active system to be operational,
wherein the node in the currently active system is formed of a plurality of nodes,
the node in the standby system is provided with the file processing sections and the block processing sections that are respectively paired with the file processing sections and the block processing sections of the plurality of nodes in the currently active system; and further comprising:
the management section
managing node state information representing states of the nodes, when failure occurs in any of the plurality of nodes in the currently active system,
storing information representing that the node is blocked in the node state information,
referring to the node state information, when the number of failed nodes is one,
setting the file processing section of the node in the standby system that is paired with the file processing section of the failed node to be operational, and
setting the block processing section of the node in the standby system that is paired with the block processing section of the failed node to be operational.

7. A non-transitory computer readable medium storing a program for providing file service for performing I/O (input/output) on a file basis and block service for performing I/O on a block basis in a storage system in which a plurality of nodes that provide the file service and the block service are coupled with each other via a network,
wherein the plurality of nodes each include a storage device that stores data, a file processing section that accepts a file I/O request from a file client and converts the file I/O request into a block I/O request in the file service, and a block processing section that carries out a process for performing I/O from/to the storage device based on the block I/O request in the block service,
the plurality of nodes include a node in a currently active system and a node in a standby system,
the program causing a computer to carry out a process of
managing the file processing section of the node in the currently active system and the file processing section of the node in the standby system as a pair, setting the file processing section of the node in the currently active system to be operational,
managing the block processing section of the node in the currently active system and the block processing section of the node in the standby system as a pair, and
setting the block processing section of the node in the currently active system to be operational,
wherein the node in the currently active system is formed of a plurality of nodes,
the node in the standby system is provided with the file processing sections and the block processing sections that are respectively paired with the file processing sections and the block processing sections of the plurality of nodes in the currently active system; and the process further comprising
managing node state information representing states of the nodes, when failure occurs in any of the plurality of nodes in the currently active system,
storing information representing that the node is blocked in the node state information,
referring to the node state information, when the number of failed nodes is one,
setting the file processing section of the node in the standby system that is paired with the file processing section of the failed node to be operational, and setting the block processing section of the node in the standby system that is paired with the block processing section of the failed node to be operational.

\* \* \* \* \*